US012287083B2

(12) United States Patent
Spink et al.

(10) Patent No.: US 12,287,083 B2
(45) Date of Patent: Apr. 29, 2025

(54) CUSTOM COMPOSITE BEAM LIGHT ASSEMBLY

(71) Applicant: QUALITE SPORTS LIGHTING, LLC, Hillsdale, MI (US)

(72) Inventors: Kenneth M. Spink, Horton, MI (US); Ryan Chase Kelley, Denver, CO (US)

(73) Assignee: Qualite Sports Lighting, LLC, Hillsdale, MI (US)

( * ) Notice: Subject to any disclaimer, the term of this patent is extended or adjusted under 35 U.S.C. 154(b) by 0 days.

(21) Appl. No.: 18/103,758

(22) Filed: Jan. 31, 2023

(65) Prior Publication Data

US 2024/0255116 A1 Aug. 1, 2024

(51) Int. Cl.

| | |
|---|---|
| ***F21V 5/00*** | (2018.01) |
| ***F21V 5/04*** | (2006.01) |
| ***F21V 7/04*** | (2006.01) |
| ***F21V 29/70*** | (2015.01) |
| *F21Y 105/16* | (2016.01) |

(52) U.S. Cl.

CPC .............. *F21V 5/007* (2013.01); *F21V 5/045* (2013.01); *F21V 7/041* (2013.01); *F21V 29/70* (2015.01); *F21Y 2105/16* (2016.08)

(58) Field of Classification Search

CPC .......... F21V 5/007; F21V 5/045; F21V 7/041; F21V 29/70; F21Y 2105/16

See application file for complete search history.

(56) References Cited

U.S. PATENT DOCUMENTS

| | | | | |
|---|---|---|---|---|
| 6,250,774 | B1 | 6/2001 | Begemann et al. | |
| 7,588,345 | B1 | 9/2009 | Davis et al. | |
| 7,614,766 | B2 | 11/2009 | Wang et al. | |
| 7,712,926 | B2 | 5/2010 | Matheson | |
| 8,356,916 | B2 | 1/2013 | Gordin et al. | |
| 8,449,144 | B2 | 5/2013 | Boxler et al. | |
| 8,517,566 | B2 | 8/2013 | Gordin | |
| 8,602,588 | B1 | 12/2013 | Gordin et al. | |
| 8,672,509 | B2 | 3/2014 | Gordin et al. | |
| 8,696,178 | B2 | 4/2014 | Gordin | |
| 8,992,047 | B2 | 3/2015 | Boxler et al. | |
| 9,360,190 | B1 * | 6/2016 | Shum ...................... | F21V 13/04 |
| 9,470,371 | B2 | 10/2016 | Kauffman et al. | |

(Continued)

FOREIGN PATENT DOCUMENTS

WO 2010033545 A2 3/2010

*Primary Examiner* — Tracie Y Green
*Assistant Examiner* — Michael Chiang
(74) *Attorney, Agent, or Firm* — Price Heneveld LLP

(57) ABSTRACT

A lighting assembly for a luminaire includes a circuit board and light sources arranged on the circuit board. A heat sink is coupled to the circuit board. A solid integrated optical array is coupled to the circuit board. The solid integrated optical array includes solid optical lenses. Each solid optical lens is disposed over a corresponding one of the light sources. Each solid optical lens includes a light guiding body defining a total internal reflection lens and an outer light directing surface. Each solid optical lens is adapted to pass a light beam in a predefined direction to form a beam pattern. Each solid optical lens is configured to maintain a base beam size of light passing therethrough, where the base beam size is less than eleven degrees. A bezel is disposed adjacent to the at least one solid integrated optical array and coupled to the heat sink.

20 Claims, 20 Drawing Sheets

(56) References Cited

U.S. PATENT DOCUMENTS

| | | | | |
|---|---|---|---|---|
| 2008/0101063 | A1 | 5/2008 | Koike et al. | |
| 2008/0298056 | A1* | 12/2008 | Petersen | F21V 17/105 362/293 |
| 2009/0323330 | A1* | 12/2009 | Gordin | F21V 11/00 362/249.02 |
| 2010/0195326 | A1* | 8/2010 | Boxler | F21K 9/68 362/249.02 |
| 2011/0103051 | A1* | 5/2011 | Wilcox | F21V 25/12 362/267 |
| 2012/0293998 | A1* | 11/2012 | Mignot | F21K 9/00 362/249.02 |
| 2012/0320585 | A1* | 12/2012 | Lin | F21V 5/007 362/319 |
| 2013/0107524 | A1 | 5/2013 | Anderson, Jr. et al. | |
| 2017/0350573 | A1 | 12/2017 | Fleszewski et al. | |
| 2018/0187862 | A1* | 7/2018 | Donato | G02B 19/0066 |

* cited by examiner

CUSTOM COMPOSITE BEAM LIGHT ASSEMBLY

FIELD OF DISCLOSURE

The present disclosure generally relates to a lighting assembly, and more particularly, to a lighting assembly for emitting a custom composite light beam and a luminaire including multiple lighting assemblies for providing a custom light output pattern.

BACKGROUND OF THE DISCLOSURE

Lighting systems for outdoor applications, such as sports stadiums, have been developed. Such systems typically include light fixtures mounted at an elevated height, such as on a pole or an elevated scaffold. Control of light generated and efficiently projecting this light to a target field using a mass production capable fixture has alluded the lighting industry. Best efforts have included running an abundance of LEDs at low output for efficiency, only to give up control of the light by using optics that are too small to control the beam adequately and the use of secondary reflection devices that absorb high percentages of reflected light. The goal is to light the entire target field evenly to a required level with the least amount of energy consumed. Efforts often fall short trying to get more light on the field while sacrificing smoothness or more often demonstrating fixture efficiency instead of overall field efficiency (ability to light the field with less energy consumption while still maintaining high levels of smoothness). An improvement over prior lighting systems was desired.

SUMMARY OF THE DISCLOSURE

According to one aspect of the present disclosure, a luminaire for illuminating a target area includes an array of lighting assemblies. Each lighting assembly includes a circuit board, solid-state light sources arranged on a surface of the circuit board, and an optical system. The optical system includes a first solid integrated optical array associated with a first portion of the light sources. The first solid integrated optical array includes fixed optical lenses defining a predefined directional focus and a predefined angular light beam for light directed therethrough to form a first beam pattern. A second solid integrated optical array is associated with a second portion of the light sources. The second solid integrated optical array includes fixed optical lenses that define a predefined directional focus and a predefined angular light beam for light directed therethrough to form a second beam pattern. The second beam pattern is different than and combined with the first beam pattern to form a composite beam for said target area. The optical system includes a combination of symmetrical and non-symmetrical configurations of the fixed optical lenses.

According to another aspect of the present disclosure, a lighting assembly for a luminaire includes a circuit board and light sources arranged on a first surface of the circuit board. A heat sink is coupled to a second surface of the circuit board. The second surface is opposite the first surface. At least one solid integrated optical array is coupled to the first surface of the circuit board. The at least one solid integrated optical array includes a base and solid optical lenses fixed thereto. Each solid optical lens is disposed over a corresponding one of the light sources. Each solid optical lens includes a light guiding body defining a total internal reflection lens and an outer light directing surface. Each solid optical lens is adapted to pass a light beam in a predefined direction to form a beam pattern. Each solid optical lens is configured to maintain a base beam size of light passing therethrough, where the base beam size is less than eleven degrees. A bezel is disposed adjacent to the at least one solid integrated optical array and coupled to the heat sink.

According to yet another aspect of the present disclosure, a method of designing a luminaire includes determining a light output pattern and distribution of light at a target area; selecting solid optical lenses to form an optical array of rows of the solid optical lenses; rotating each solid optical lens about an aiming axis to define a direction of directed light in conjunction with redirection of the directed light by a molded light directing surface to form a beam pattern of the optical array, each solid optical lens being a narrow beam optical lens configured to define a base beam size of less than eleven degrees for the directed light passing therethrough; molding the solid optical lenses into the optical array; selecting and positioning multiple optical arrays over light sources on a circuit board to form a light assembly defining a composite light beam; and selecting multiple light assemblies to form the luminaire defining the light output pattern and the distribution of light at the target area.

These and other aspects, objects, and features of the present disclosure will be understood and appreciated by those skilled in the art upon studying the following specification, claims, and appended drawings.

DETAILED DESCRIPTION

Figure 1:
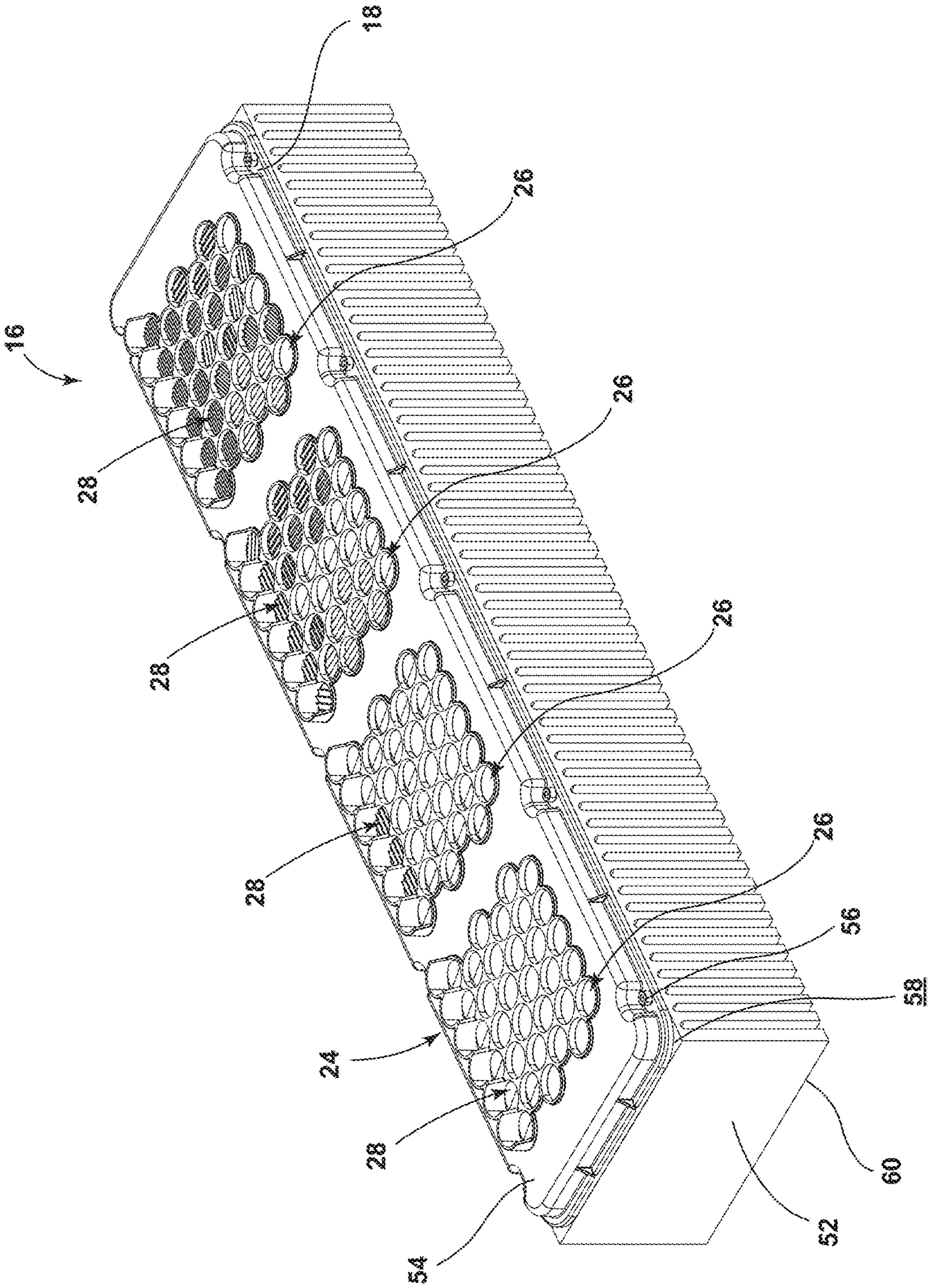
FIG. 1 is a side perspective view of a lighting assembly including an optical system with multiple optical arrays, according to the present disclosure.

As referenced in the figures, the same reference numerals may be used herein to refer to the same parameters and components or their similar modifications and alternatives. For purposes of description herein, the terms “upper,” “lower,” “right,” “left,” “rear,” “front,” “vertical,” “horizontal,” and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale The terms “including,” “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises a . . . ” does not, without more constraints, preclude the existence of additional identical elements in the process, method, article, or apparatus that comprises the element.

With reference to FIGS. 1-31, reference numeral 10 generally designates a luminaire 10 for illuminating a target area 12 that includes an array 14 of lighting assemblies 16. Each lighting assembly 16 includes a circuit board 18, solid-state light sources 20 arranged on a surface 22 of the circuit board 18, and an optical system 24. The optical system 24 includes multiple optical arrays 26, including optical arrays **26*a*-26*e*, having optical lenses 28 associated with groupings 30 of the light sources 20. The groupings 30 include groupings or portions 30*a*-30*d* arranged on the circuit board 18. The optical arrays 26 form beam patterns 32 that correspond with a configuration of the respective optical arrays 26*a*-26*e***.

For example, the optical system 24 includes the first solid integrated optical array **26*a* associated with the first portion 30*a* of the light sources 20. The first solid integrated optical array 26*a* includes fixed optical lenses 28 defining a predefined directional focus and a predefined annular light beam for light directed therethrough to form a first beam pattern 32. The optical system 24 also includes a second solid integrated optical array 26*b* associated with the second portion 30*b* of the light sources 20. The second solid integrated optical array 26*b* includes fixed optical lenses 28 defining a predefined directional focus and a predefined annular light beam for light directed therethrough to form a second beam pattern 32. The second beam pattern 32 is different than and combined with the first beam pattern 32 to form a composite beam 34 for the target area 12. The optical system 24 also includes a combination of symmetrical and non-symmetrical configurations of the fixed optical lenses 28**.

The optical system 24 uses numerous “mini-spotlights” to form the beam patterns 32 and, consequently, the composite beam 34. Each “mini-spotlight” is formed by the light beam emitted from one LED 20 and through the corresponding optic 28. Generally, a beam width is defined by a center beam intensity and a number of degrees until the center beam declines to 10% (times 2) of the max value. The raw beam from each optic 28 is a light beam that has a width of less than 11 degrees. This raw beam of light having the width of less than 11 degrees is then bent in different ways to move the light beams to form the beam patterns 32. Accordingly, the optics 28 redirect an 11-degree base beam as described herein.

The luminaire 10 provides a lighting effect 50 or light output pattern 50 for the target area 12 that is adjustable and customizable. The light output pattern 50 can be adjusted and customized during the manufacturing and assembly of the lighting assemblies 16, as well as the assembly of the luminaire 10. Further, the adjustment and customization of the light output pattern 50 may also be accomplished via adjusting light intensity when the luminaire 10 is assembled and in operation. The luminaire 10 and the manufacturing process thereof provide a light fixture that can achieve a full range of beam patterns 32 by using narrow optics 28.

Figure 2:
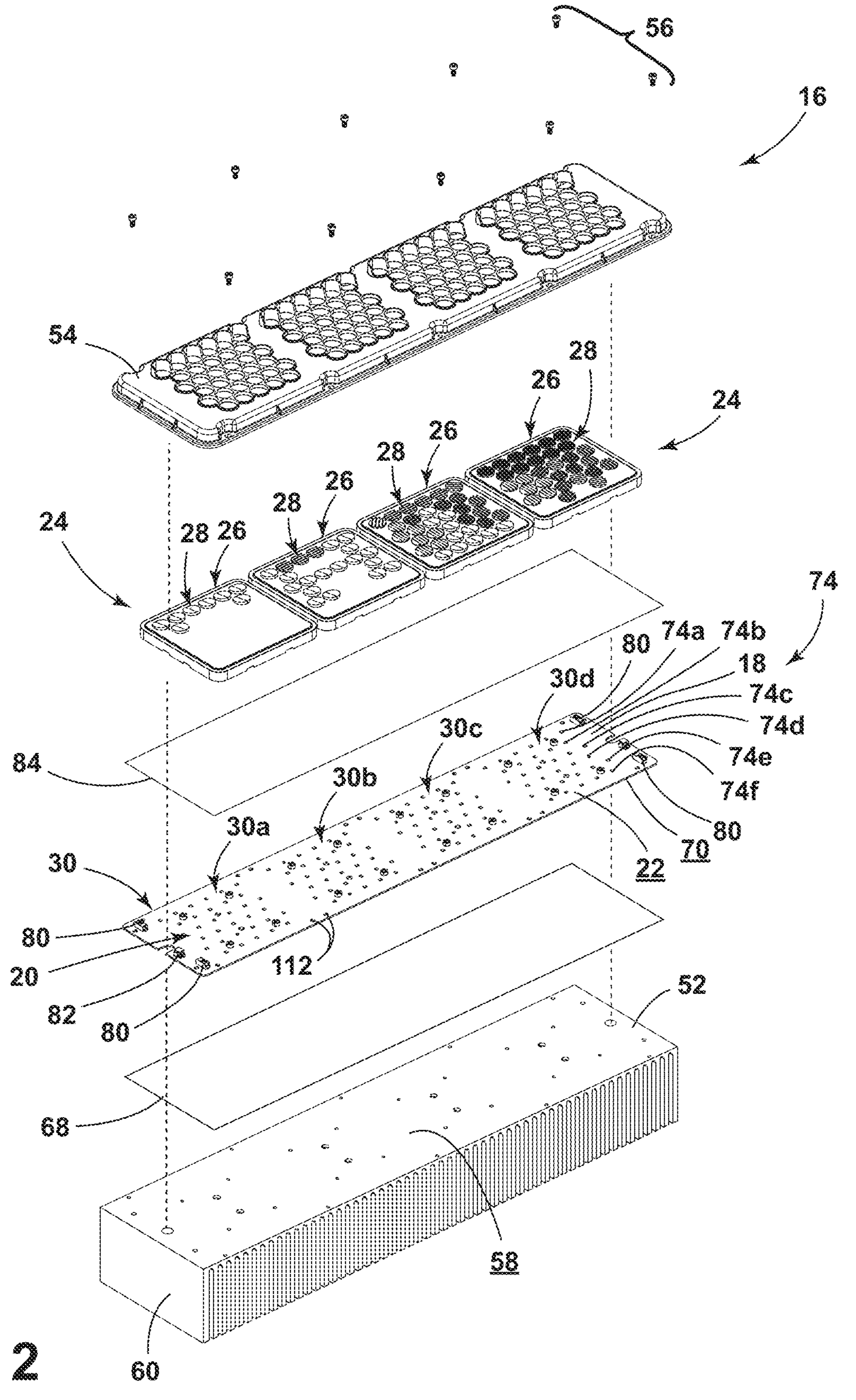
FIG. 2 is an exploded side perspective of a lighting assembly having an optical system, according to the present disclosure.

Referring to FIGS. 1 and 2, an exemplary light assembly 16 that can be included in the array 14 of lighting assemblies 16 is illustrated. The light assembly 16 includes a heatsink 52, the circuit board 18 with the light sources 20 disposed on the heatsink 52, the optical system 24 including four optical arrays 26 disposed on the circuit board 18, and a bezel 54 disposed over the optical arrays 26. The bezel 54 is configured to be fastened to the heatsink 52 via fasteners 56, which assists in coupling the optical system 24 and the circuit board 18 to the heatsink 52. The four optical arrays 26 illustrated in FIGS. 1 and 2 are exemplary configurations of the optical system 24. The selected optical arrays 26 for the lighting assembly 16 are based on the beam patterns 32 produced by the optical arrays 26 and the overall lighting effect 50 to be produced as described herein.

The heatsink 52 includes a support surface 58 and fins 60 extending away from the support surface 58. The fins 60 extend laterally, which is generally in a top-to-bottom direction of the lighting assembly 16 (see FIG. 30). This configuration of the heatsink 52 may also be described as having vertical fins 60 based on the mounting orientation of the lighting assembly 16. This vertical configuration of the fins 60 dissipates heat faster than fins extending along a longitudinal extent of the heatsink 52 (e.g., right-to-left or horizontally extending fins).

In various aspects, the heatsink 52 may be formed through various processes. Generally, the fins 60 define a square shape, though the fins 60 may form other shapes, such as a semicircle, without departing from the teachings herein. In various non-limiting examples, the fins 60 extend about three inches from the support surface 58 and have a width that aligns with a width of the support surface 58 or front face of the heatsink 52, which is about 6 inches. Increased heat dissipation occurs closer to the support surface 58 compared to proximate to the distal ends of the fins 60. The heat dissipation decreases further away from the support surface 58. Accordingly, the three-inch length of the fins 60 provides dissipation along at least a substantial portion or an entire length of the fins 60. Increasing the length of the fins 60 significantly beyond this exemplary length may not significantly increase heat dissipation.

Referring still to FIGS. 1 and 2, a thermal transfer layer 68 is disposed on the support surface 58 of the heatsink 52 and between the support surface 58 and a second surface 70 of the circuit board 18. The thermal transfer layer 68 is generally a thin layer that conforms to the support surface 58 of the heatsink 52 and a second, lower surface 70 of the circuit board 18 when the lighting assembly 16 is assembled. In a non-limiting example, the thermal transfer layer 68 has a thickness of about 5/1000 inches. The thermal transfer layer 68 typically includes cutouts for the fasteners 56 to extend therethrough. The thermal transfer layer 68 includes a high graphite content to allow high thermal transfer from the circuit board 18 to the heatsink 52 for heat dissipation.

The circuit board 18 having the solid-state light sources 20 is disposed on the thermal transfer layer 68. The circuit board 18 may include one or more circuits and may be configured as a printed circuit board. The solid-state light sources 20 are generally light-emitting diodes 20 (LEDs 20) that are arranged in groupings 30 across the surface 22 of the circuit board 18. Each grouping 30 includes multiple rows 74 of LEDs 20 in a specific pattern. In the illustrated configuration, the LEDs 20 are arranged in four groupings 30*a*-30*d* and each grouping 30 has six rows 74 of LEDs 20, which includes rows 74*a*-74*f*. Generally, a number of LEDs 20 alternates from the first or top row 74*a* to the sixth or bottom row 74*f*. As illustrated, the odd-numbered rows 74 (first, third, and fifth rows 74*a*, 74*c*, 74*e*) have six LEDs 20, while the even-numbered rows 74 (second, fourth, and sixth rows 74*b*, 74*d*, 74*f*) have five LEDs 20, totaling 33 LEDs 20 per grouping 30. Accordingly, the one circuit board 18 supports 132 LEDs 20. This number and arrangement of LEDs 20 provide the composite beam 34 formed by the lighting assembly 16. Further, this configuration of LEDs 20 allows for increased or maximized customization of 132 "mini-spotlights" of narrow beams of light (e.g., less than 11-degree base beam width) that are rotated and directed (using various optics 28) to form the composite beam 34.

Referring still to FIGS. 1 and 2, each opposing end of the circuit board 18, which are illustrated as the right and left ends, includes wire or power terminals 80. Accordingly, the circuit board 18 may be powered from either end of the circuit board 18. The alternating number of LEDs 20 in the rows 74 results in an asymmetrical arrangement of LEDs 20 (i.e., six LEDs 20 on the top and five LEDs 20 on the bottom in each grouping 30). In this way, the circuit board 18 has a specific orientation with the first row 74*a* at the top of the circuit board 18 having the six LEDs 20. Accordingly, the circuit board 18 typically cannot be rotated 180° independently of the remainder of the lighting assembly 16. Having the power terminals 80 at each side of the circuit board 18 is advantageous for the asymmetrical configuration of the LEDs 20. For example, when multiple lighting assemblies 16 are coupled together (see FIG. 30), the lighting assemblies 16 can be arranged in any order and powered on either end. This provides increased flexibility in the luminaire 10 for producing the overall lighting effect 50. The lighting assemblies 16 may be interchanged or moved relative to one without the power connection impeding such rearranging.

A thermal overload circuit 82 is disposed between the power terminals 80 on each end of the circuit board 18. The thermal overload circuit 82 is generally a resistor circuit where increased heat (based on various sensors and circuits) increases resistance. It is understood that once the resistance is outside of a predefined range, the temperature has also increased outside of a predefined temperature range. The resistance can be defined within limits, such that the LEDs 20 may be de-rated, and the power lowered to cool the lighting assembly 16 until the resistance returns to the predefined range.

Referring still to FIGS. 1 and 2, a barrier layer 84 is disposed on the surface 22 of the circuit board 18. The barrier layer 84 defines apertures for receiving the LEDs 20, the fasteners 56, and the power terminals 80. Accordingly, the barrier layer 84 does not extend over the LEDs 20, impede the powering of the circuit board 18, or impede the assembling of components of the lighting assembly 16. The barrier layer 84 allows for the removal of an additional outer lens extending over the circuit board 18, the LEDs 20, and the optical arrays 26. The outer barrier layer 84 can be black in color to limit unwanted light (glare) escaping between optics 28. This barrier layer 28 is sealed to each array 26, as well as the heatsink 52 so that no additional outer lens is required. This additional outer lens can affect emitted light from the LEDs 20 and reduce the efficiency of the lighting assembly 16. Accordingly, the use of the barrier layer 84 is advantageous for producing the selected lighting effect 50 and controlling glare.

Figure 3:
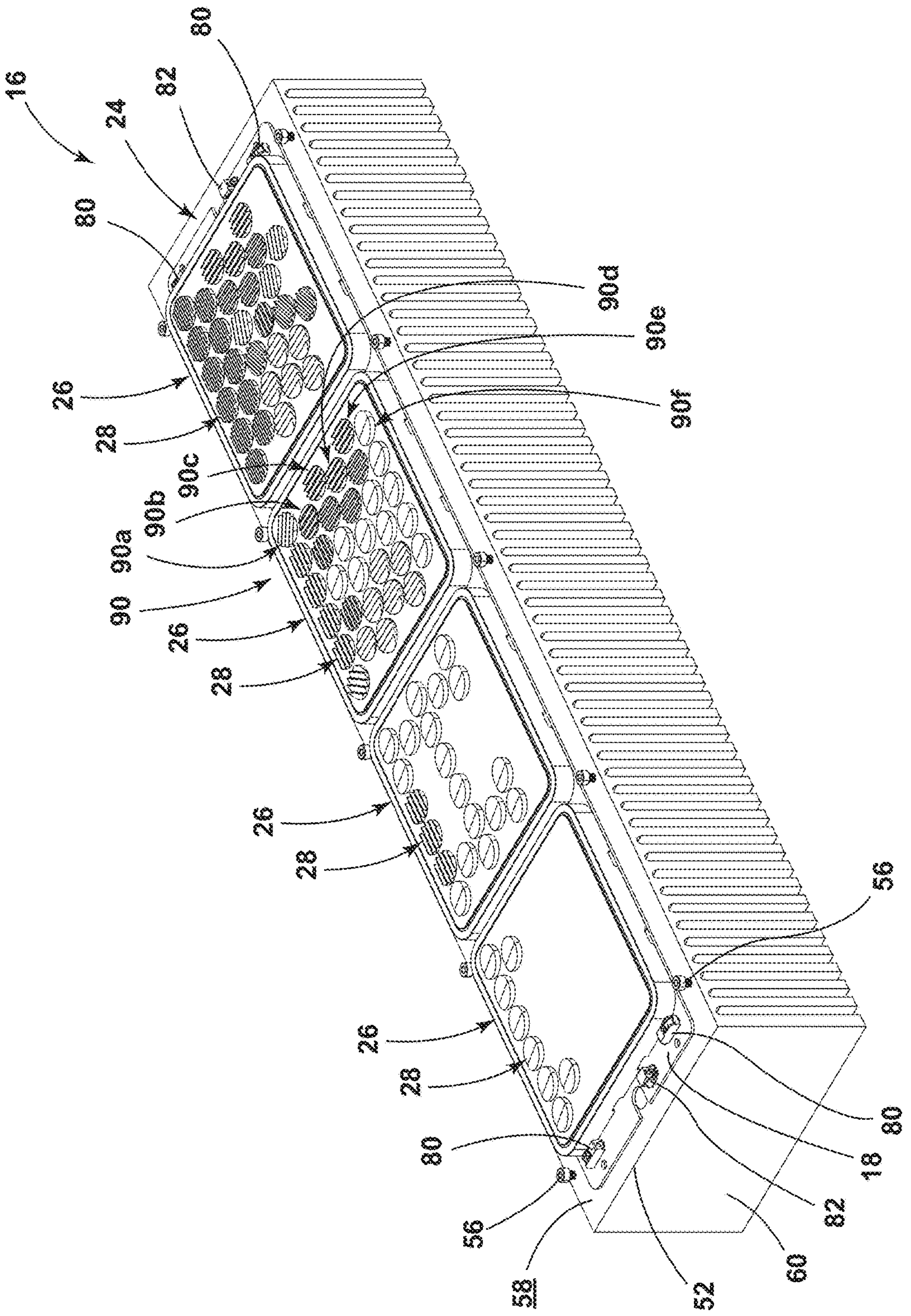
FIG. 3 is a side perspective view of a lighting assembly including an optical system with multiple optical arrays and with a bezel removed, according to the present disclosure.

Referring still to FIG. 2, as well as FIG. 3, the lighting assembly 16 includes the optical system 24 for directing the focus of the emitted light beams from the LEDs 20 and maintaining the predefined angle of light for the emitted light beams. The optical system 24 includes multiple optical arrays 26, each having fixed optical lenses 28 that align and correspond with one of the LEDs 20 on the circuit board 18. In the illustrated configuration, each optical array 26 corresponds with one of the groupings 30 of LEDs 20. Accordingly, there are four optical arrays 26 disposed over the LEDs 20 on the circuit board 18. Further, as each grouping 30 of LEDs 20 in the illustrated configuration includes 33 LEDs 20, each optical array 26 includes 33 optical lenses 28 arranged in six rows 90*a*-90*f*, collectively referred to as rows 90, in the same alternating pattern as the LEDs 20.

There are numerous optical arrays 26 that can be created by changing various aspects related to the optical lenses 28, which may also be referred to as optics 28. Each optical lens 28 includes a light guiding body 92, such as a symmetrical light guiding body 92*a* or a non-symmetrical light guiding body 92*b*, and a light directing surface 94, also called an optical face 94 or light refracting surface 94. Different optical arrays 26 can be created through at least, but not limited to, an arrangement of the optical lenses 28, a rotational position of the optical faces 94, having the light guiding body 92 be symmetrical or non-symmetrical relative to at least one plane, an orientation or rotational position of the non-symmetrical light guiding body 92*b* or bodies 92*b*, a configuration of the light directing surface 94, position of the light directing surface 94 relative to a surrounding base surface 96, and combinations thereof. Five exemplary optical arrays 26*a*-26*e* are described in detail herein, where each includes different configurations and arrangements of optical lenses 28 to produce different beam patterns 32 and, consequently, composite beams 34. Other configurations of optical arrays 26 are contemplated without departing from the teachings herein.

Each optical array 26 includes a base 104 surrounded by an outer rim 106. The base 104 couples together each optical lens 28. In the illustrated configuration, each optical array 26 has a width (left-to-right) of from about 130 mm to about 140 mm, a height (top-to-bottom) of from about 115 mm to about 125 mm, and a depth (bottom of the rim 106 to top of the rim 106) of from about 5 mm to about 15 mm. The outer rim 106 extends from the circuit board 18 and toward the base 104, defining a generally "L" shape. A groove 108 extends between the base surface 96 and the outer rim 106, following a perimeter of the base surface 96. A distance between an outer edge of the rim 106 to the base surface 96 is from about 3 mm to about 8 mm. In various aspects, the base surface 96 is offset from a surface of the outer rim 106. Accordingly, the base surface 96 is disposed further away from the circuit board 18 than the surface of the outer rim 106 by a distance from about 0.5 mm to about 1 mm.

The outer rim 106 is configured to be disposed on the circuit board 18 around a single grouping 30 of LEDs 20. The optical lenses 28 extend from the circuit board 18, surrounding the corresponding one LED 20, and extend to or beyond the base surface 96. The base 104 is spaced from the surface 22 of the circuit board 18 by the outer rim 106 and the optical lenses 28.

Locating feet 110 extend from the outer rim 106 of each optical array 26. In various aspects, the locating feet 110 extend between about 0.5 mm and about 2 mm from a bottom of the outer rim 106. The locating feet 110 are spaced apart around the outer rim 106 and are used to position and align the optical arrays 26 relative to the circuit board 18 and the LEDs 20. In the illustrated configuration, each of the optical arrays 26 defines a rectangular or square shape, and the locating feet 110 extend from corners of the optical array 26. In this configuration, the horizontally aligned feet 110 are spaced apart by a distance from about 115 mm to about 130 mm, and the vertically aligned feet 110 are spaced apart by a distance from about 105 mm to about 115 mm.

The circuit board 18 defines receiving apertures 112, which are configured to receive the locating feet 110. The locating feet 110 have a width or diameter in a range from about 0.1 mm to about 0.5 mm, and the receiving apertures 112 have a corresponding shape and size to receive the locating feet 110. An engagement between the locating feet 110 and the receiving apertures 112 retains the alignment between the optical lenses 28 and the LEDs 20.

The optical arrays 26 of the optical system 24 are disposed in a linear, side-by-side arrangement along the circuit board 18. Generally, the optical arrays 26 extend from a top edge of the circuit board 18 to a bottom edge of the circuit board 18. The optical arrays 26 are disposed adjacent to one another and may be spaced apart, as illustrated in FIG. 3, or may be abutting one another. The optical arrays 26 are disposed between the power terminals 80 on each end, allowing access to the power terminals 80 when the optical arrays 26 are disposed on the circuit board 18.

Referring to FIGS. 3-26, the optical system 24 for each lighting assembly 16 is constructed of four optical arrays 26 per circuit board 18. In various examples, the lighting assembly 16 is a single fixture, including one heatsink 52, one circuit board 18, and four optical arrays 26. This configuration may be a 2-foot lighting assembly 16. In additional or alternative examples, the lighting assembly 16 is a double fixture, including two heatsinks 52, two circuit boards 18, and eight optical arrays 26. The double fixture may be two single fixtures coupled together. This configuration may be a 4-foot lighting assembly 16. The set of optical arrays 26 to form the optical system 24 may be chosen from one or more configurations of the optical arrays 26 disclosed herein. Accordingly, the optical arrays 26 positioned over one circuit board 18 may be all the same configuration, have some be the same configuration, or may be all different configurations. The selected optical arrays 26 and the positioning of the optical arrays 26 on the circuit board 18 (e.g., aligned with which grouping 30 of LEDs 20) may be chosen based on the beam pattern 32 produced by the optical array 26, as well as desired or selected composite beam 34 and the lighting effect 50 to be generated for the target area 12.

The optical lenses 28 are configured to guide, direct, and/or move the light beams emitted from the LEDs 20. Depending on the configuration of the optical lenses 28, the light beam may be directed along an aiming axis 120 (FIG. 28) of the LED 20, which is generally perpendicular to the surface 22 of the circuit board 18, or may be moved or angled relative to the aiming axis 120. When the light beam is not moved relative to the aiming axis 120, the aiming axis 120 may coincide with a center intensity of the light beam. This direction or movement relative to the aiming axis 120 may be referred to as the focus of the emitted light. Accordingly, the optical lenses 28 define the focus of the emitted light for the corresponding LEDs 20.

Additionally, the optical lenses 28 are configured to define the predefined width or size of light for the light beams emitted therethrough. The predefined base beam width is less than 11 degrees for each light beam, respectively. The predefined width is determined by the ratio between the size of the LED 20 and the size of the corresponding optical lens 28. Accordingly, the optical system 24 utilizes numerous narrow beams or "spotlights" to form the beam patterns 32 and composite beam 34.

Referring still to FIGS. 3-26, each optical lens 28 includes the light guiding body 92 and the outer light directing surface 94. The light guiding body 92 extends from the circuit board 18 toward the base 104 of the optical array 26. The light guiding body 92 may terminate at the base 104 or may extend beyond the base surface 96. Between the circuit board 18 and the base 104, the light guiding body 92 includes an inner side surface and beyond the base 104 the light guiding body 92 includes an outer side surface of the optical lens 28. The light guiding body 92 generally forms a substantially solid conical or frustro-conical shape. The optical lens 28 increases from an outer width or diameter at the circuit board 18 of about 5 mm to an outer width or diameter of the optical face 94 of about 17 mm.

Additionally, the light guiding body 92 may be symmetrical or non-symmetrical along at least one plane. In symmetrical examples, a thickness of the light guiding body 92 is consistent about the aiming axis 120, which generally aligns with a center axis of the optical lens 28. The thickness proximate to where the optical lens 28 interfaces with the circuit board 18 is between about 0.3 mm and about 0.5 mm.

Figure 8:
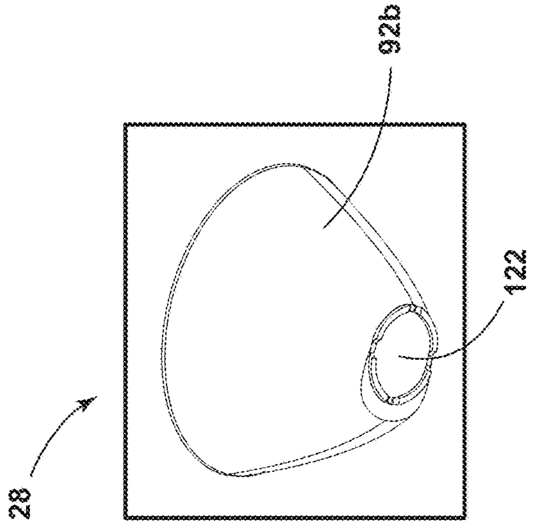
FIG. 8 is a side perspective view of an optical lens having a non-symmetrical light guiding body, according to the present disclosure.

In non-symmetrical examples, as illustrated in FIG. 8, a portion or portions of the light guiding body 92 have an increased thickness to be non-symmetrical along at least one plane. The increased thickness generally does not form an arcuate shape following the overall frustro-conical shape of the light guiding body 92, contributing to the non-symmetrical nature. This portion has an increased thickness between about 0.5 mm and about 2.5 mm. Accordingly, the thickness of the optical lens 28 proximate to where the optical lens 28 interfaces with the circuit board 18 is between about 0.3 mm and about 0.5 mm, and where the optical lens 28 is thinner and up to between about 0.8 mm and about 3 mm where the optical lens 28 is thickest.

In certain aspects, between about one-quarter and about one-half of the light guiding body 92 may have an increased thickness to form the non-symmetrical configuration. In such examples, a majority of the light guiding body 92 has a lesser thickness. In alternative non-limiting aspects, between about one-half and about three-quarters of the light guiding body 92 may have the increased thickness. In such examples, the majority of the light guiding body 92 has the greater thickness. The non-symmetrical light guiding bodies **92*b* may affect the direction or focus of the emitted light utilizing a center beam intensity and less material in the optical face 94. The change in direction or focus may be caused by the additional or lesser material the light is transmitted through before reaching the optical face 94 without having a thicker optical face 94** defining light directing features.

The light guiding body 92 defines a total internal reflection (TIR) lens 122 integrally defined or molded within the solid optical lens 28 for collimating and guiding the emitted light. Accordingly, each light guiding body 92 defines a cavity positioned over the corresponding LED 20 (see FIG. 28). A width or diameter of the cavity is in a range from about 4 mm to about 5 mm. The emitted light is directed toward an inner surface and through the light guiding body 92 to the side surface. The light is redirected by the side surface to be directed through the light directing surface 94 or optical face 94. With any of the configurations of the optical lenses 28 disclosed herein, the emitted light is configured to reach the side surface at an angle less than 45°. This allows the light to be redirected by the light guiding body 92 rather than being emitted through the side surface, reducing light loss and reducing glare.

Each optical lens 28 also includes the integral or molded light directing surface 94 for redirecting light to at least partially define the direction or focus of the emitted light. The light directing surface 94 is configured to define the predefined focus or direction for the emitted light relative to the aiming axis 120. The specific configuration of the light directing surface 94 is based on the composite beam 34 and overall lighting effect 50 to be produced. Different light directing surfaces 94 are used based on how the surface 94 adjusts the focus on the light, including movement of the light beam to disperse the multiple "spotlights" (while maintaining the narrow "spotlights") to form the composite beam 34. For example, certain optical lenses 28 may allow the light to pass therethrough without substantially moving the light relative to the aiming axis 120. In additional non-limiting examples, the light directing surface 94 may direct or move for the emitted light to focus the light at an angle relative to the aiming axis 120. In such examples, the emitted light from certain LEDs 20 may be moved left, right, up, down, etc. In a specific example, the emitted light for selected LEDs 20 can be moved about 5° left or 5° right relative to the aiming axis 120 to form a broader or larger beam pattern 32 in one direction only. In other words, the base beam from each LED 20 is bent or rotated in a single direction to fill a specific spot or location within the designed beam pattern 32.

Referring still to FIGS. 3-26, in order to move the light beams to form the beam pattern 32 and subsequently the composite beam 34, various optical lenses 28 having the predefined configurations of the optical face 94 and light guiding body 92 are selected for inclusion in the optical array 26, are disposed in a predefined position, and one or both of the optical face 94 and the light guiding body 92 are rotated to move the light to the selected degree in the selected direction. The rotation may be utilized to position the non-symmetrical light guiding body **92*b* and/or the light directing surface 94**.

According to various aspects, each light guiding body 92 and optical face 94 of the optical lens 28 may be rotated between a 0° position and about +/−180°. In various examples, the optical lenses 28 may be rotated about 45°, about 90°, about −45°, or about −90° relative to the aiming axis 120. For example, a certain light directing surface 94 may move the emitted light 5° relative to the aiming axis 120. When this optical lens 28 is rotated 90°, the light is directed right, and when the optical lens 28 is rotated −90°, the light is directed left. In this way, the same optical lenses 28 may be utilized at different rotational positions to generate different focuses or directions of the emitted light. In addition to defining the focus or direction for the emitted light, the optical lenses 28 are configured to define and maintain the angle of the emitted light beam. As described herein, each optical lens 28 defines and maintains the narrow light base beam width of less than 11 degrees.

The light directing surface 94 may have various relationships to the base 104 depending on the configuration. In various aspects, the light directing surface 94 may be coplanar with the base surface 96. In additional non-limiting examples, a portion of the light directing surface 94 may be aligned with the base surface 96 and another portion may be offset from the base surface 96, forming a slanted and/or sloped configuration. In yet additional non-limiting examples, an entirety of the light directing surface 94 may be offset from the base surface 96. Generally, when offset from the base surface 96, the optical lens 28 protrudes relative to the base surface 96.

Figure 9:
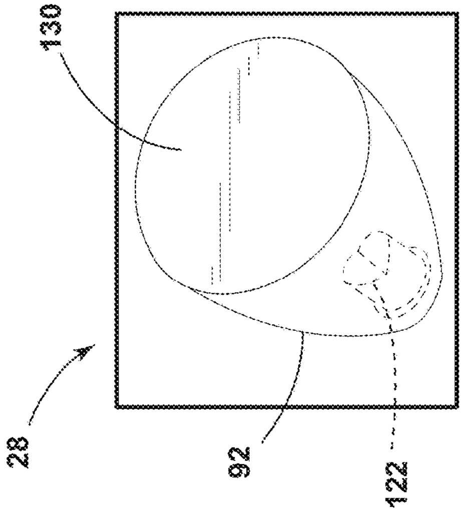
FIG. 9 is a side perspective view of an optical lens having a light guiding body and a flat lens, according to the present disclosure.

Various types of the light directing surfaces 94 may be utilized with the optical lenses 28. These light directing surfaces 94 may include flat or planar lenses 130, a Fresnel style lens 132, such as Fresnel style lenses 132*a*-132*d*, an elevated conical lens 134, an optic having a revolved inverted conical face 136, or rotated configurations thereof. As illustrated in FIG. 9, the flat lens 130 has a generally smooth and flat light directing surface 94. The flat lens 130 may be coplanar with the base surface 96. This lens 130 may not substantially move the emitted light beam relative to the aiming axis 120, and, therefore, may be used more often in narrower composite beams 34. In other words, the flat lens 130 may be used for a more direct light beam with minimal efficiency loss. The flat lens 130 may also offset from the base surface 96, remaining parallel from the base surface 96 but with the optical lens 28 protruding therefrom. Further, the flat lens 130 may also be slanted, having a portion offset from the base surface 96. Slanting the flat lens 130 may move the light beam more, which may be accomplished using the center beam intensity and additional material for the light to be emitted through.

Figure 16:
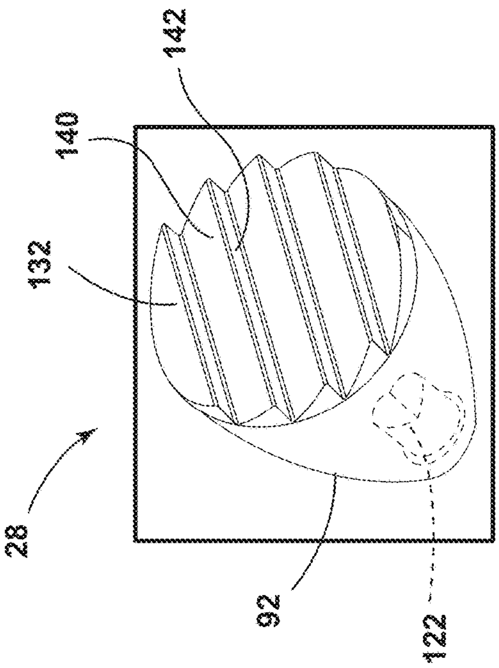
FIG. 16 is a side perspective view of an optical lens having a light guiding body and a Fresnel style lens, according to the present disclosure.
Figure 18:
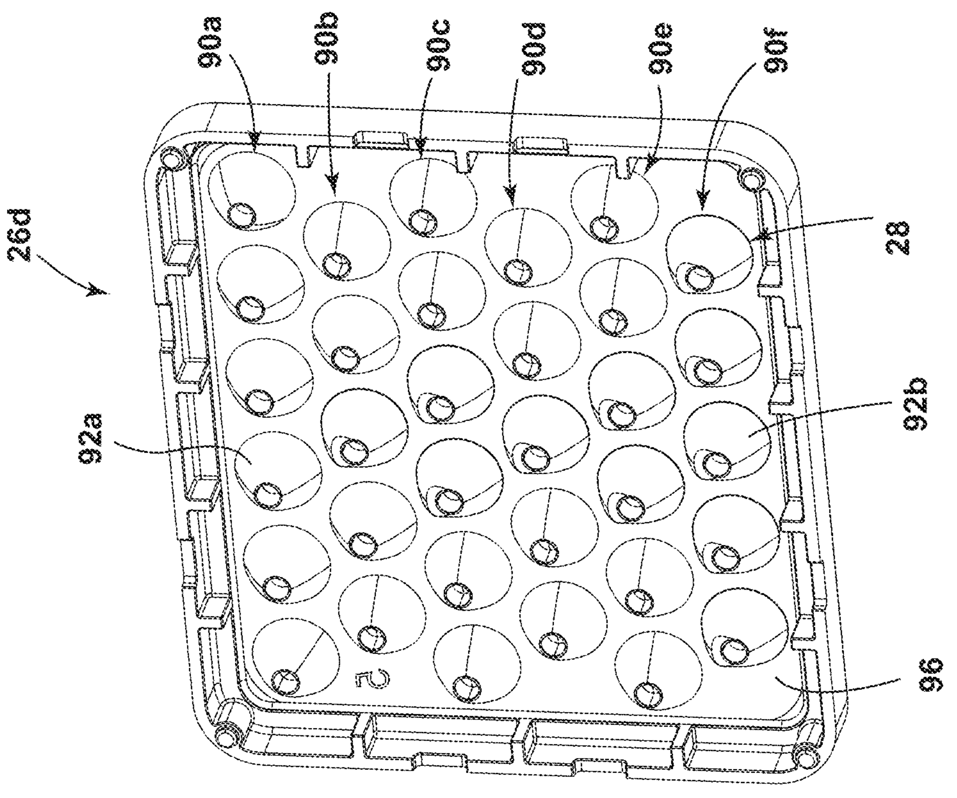
FIG. 18 is a rear perspective view of the fourth optical array of FIG. 17, illustrating light guiding bodies of the optical lenses, according to the present disclosure.
Figure 17:
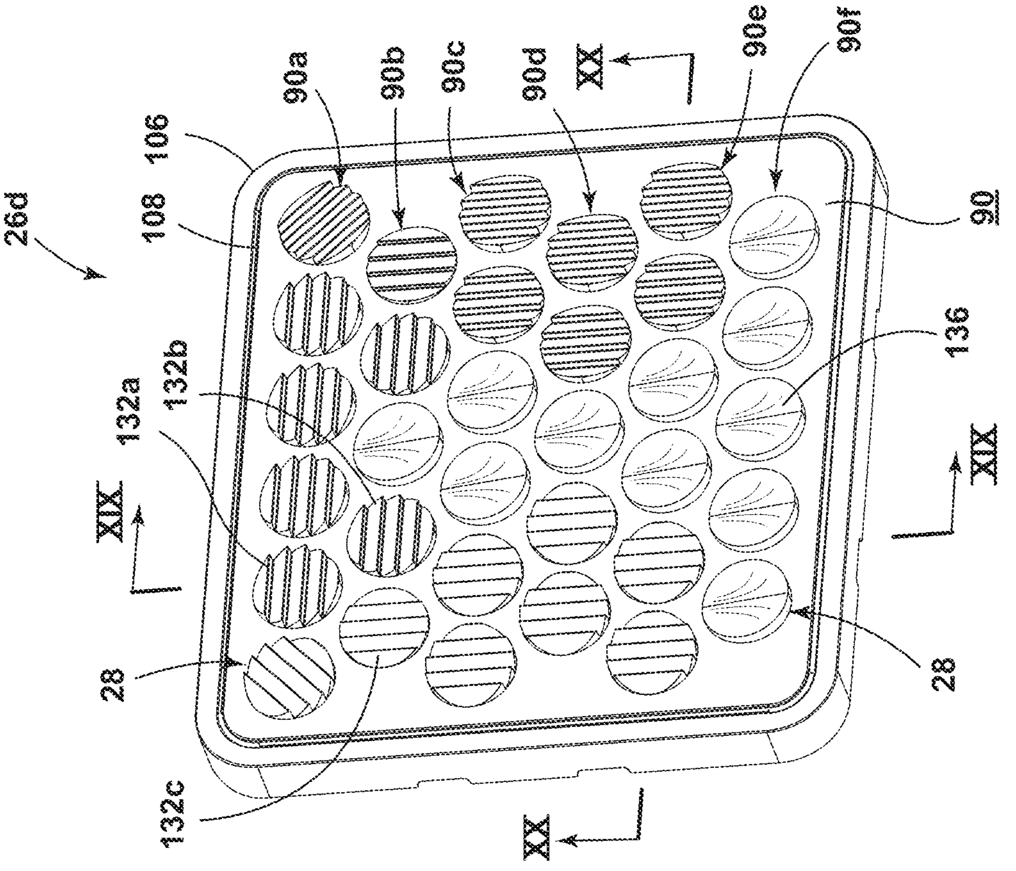
FIG. 17 is a front perspective view of a fourth optical array with optical lenses, according to the present disclosure.
Figure 26:
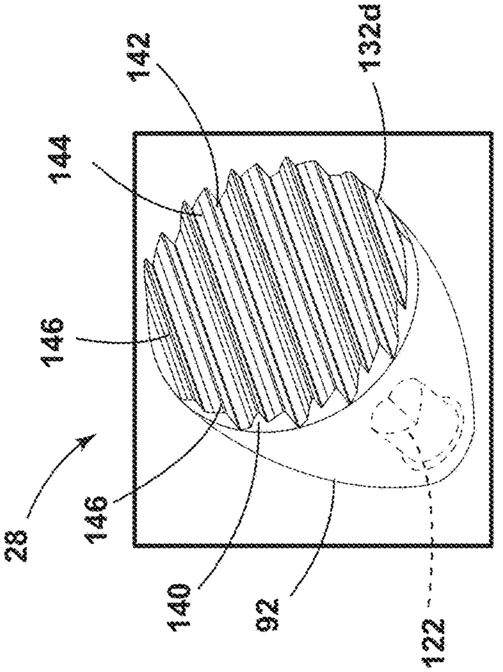
FIG. 26 is a side perspective view of an optical lens having a light guiding body and a Fresnel style lens with primary and secondary ridges and grooves, according to the present disclosure.

As illustrated in FIGS. 16 and 26, the Fresnel style lens 132 may be used to move the light beam more than other disclosed configurations. The Fresnel style lens 132 generally refracts or moves the light beam based on an alternating pattern of ridges 140 and groove 142 (e.g. steps) set at predefined angles relative to the aiming axis 120. The ridges 140 and grooves 142 may be any practicable repeated regular or irregular pattern, extending partially or entirely across the optical face 94. In various examples, the Fresnel style lens 132 may define the alternating pattern of grooves 142 and ridges 140, each forming a generally triangular or wedge shape. In additional non-limiting examples, each ridge 140 may define a secondary groove 144 between secondary ridges 146, where the secondary grooves 144 are smaller than the primary grooves 142. As the Fresnel style lens 132 moves the light beam a greater degree, the Fresnel style lens 132 is more often used in wider or larger composite beams 34.

The light directing surface 94 may also define an elevated conical lens 134. In such examples, the optical face 94 is offset from the base surface 96 as the optical lens 28 protrudes relative to the base surface 96. The elevated conical lens 134 may be symmetrical with a vertex of the conical shape, which is generally the lowest point of the cone, being in a center of the optical face 94 and aligned with the aiming axis 120. In additional non-limiting examples, the elevated conical lens 134 may be non-symmetrical, such that the vertex of the conical shape is offset from a center of the optical face 94. In such examples, the center of the conical shape is also offset from the corresponding LED 20. The conical lens 134 may define an inverted conical lens 134 or a protruding conical lens 134 (where the vertex is the highest point).

Figure 7:
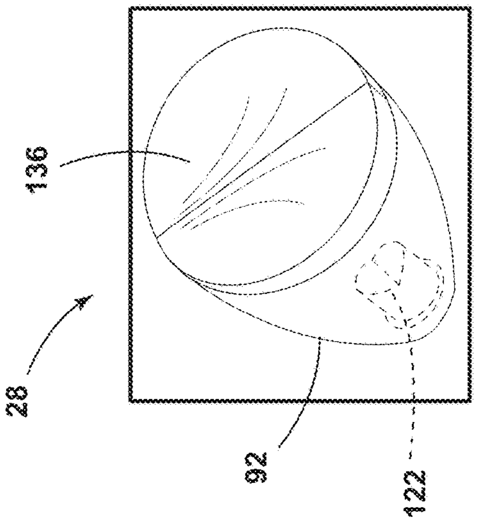
FIG. 7 is a side perspective view of an optical lens having a light guiding body and a slanted inverted conical face, according to the present disclosure.

The light directing surface 94 may be configured as an optic having a revolved inverted conical face 136, as illustrated in FIG. 7. The light directing surface 94 slopes on a radial arc to the vertex of the conical shape. The radial arc may be consistent from one end to the other. Alternatively, the radial arcs may increase in curvature along the length of the radial arc (e.g., an exponential-type curvature). Further, the revolved inverted conical face 136 can be symmetrical, where the vertex is centered in the conical face 136, or non-symmetrical, where the vertex is off-center.

The revolved inverted conical face 136 may be a specific example of the elevated conical lens 134. In such examples, the inverted conical face 136 is slanted having an elevated portion, offset or protruding from the base surface 96. The optical lens 28 may also have a portion of the optical face 94 that is generally aligned with the base surface 96. When the revolved inverted conical face 136 is slanted, the optical face 94 increases in distance from the base surface 96 from one side to an opposing side. In such examples, the conical face 136 generally extends from the base surface 96 at the vertex and extends to about 3 mm from the base surface 96.

The slanted inverted conical face 136 may also have an off-center vertex. In the illustrated slanted examples, the vertex of the inverted conical shape is at the outer edge of the optical face 136, affecting the radial arc from the vertex to the outer edge along the perimeter or circumference of the optical lens 28. This configuration defines different radii from the vertex of the conical shape to various locations along a perimeter of the optical face 94. The slope may have different curvatures and/or different lengths. The radius or slope to closer locations along the outer edge of the optical face 94 is generally different than the radius or slope in further locations along the optical face 94. For example, if the vertex of the conical shape is at a 12 o'clock position of the optical face 94, the radius or curve from the 12 o'clock position to the 2 o'clock position is different than the radius or curve from the 12 o'clock position to the 6 o'clock position based on the location of the vertex and the slanted configuration. This configuration of the optical face 94 may be advantageous for maintaining the narrow light base beam of less than 11 degrees and moving the light beam efficiently relative to the aiming axis 120.

Referring still to FIGS. 3-26, the symmetrical light guiding body 92*a* may be used in combination with any of the configurations of the optical face 94 disclosed herein, and the non-symmetrical light guiding body 92*b* may also be used in combination with any of the optical faces 94 disclosed herein. Further, different combinations of the rotational position of the optical face 94 and different rotational positions of the non-symmetrical light guiding body 92*b* may be used. Accordingly, the optical arrays 26 may include a combination of one or more optical faces 94, as well as combinations with the symmetrical and non-symmetrical light guiding bodies 92*a*, 92*b*. Moreover, each optical face 94 and each light guiding body 92 can be rotated relative to the aiming axis 120.

With further reference to FIGS. 3-26, each optical array 26 is a solid integrated feature that is generally constructed of optical silicone. Accordingly, the outer rim 106, the base 104, and the optical lenses 28 are constructed of silicone and ultimately fixed or molded together. Silicone may better resist a yellowing effect that is common in acrylic and polycarbonate optics. Further, by resisting this yellowing effect, the optical arrays 26 maintain a higher light transmissivity and efficiency compared to other conventional materials. Silicone can be over 50% more resistant to yellowing compared to conventional acrylic and polycarbonate. Moreover, conventional materials tend to be more brittle, resulting in a higher tendency to be cracked, chipped, or damaged. The optical arrays 26 constructed of silicone have increased durability, such that the optical arrays 26 are less susceptible to the cracking or damage generally affected by the conventional materials. The silicone can also withstand greater amounts of heat, and may be able to withstand about twice as much heat as conventional materials. Further, the use of the optical silicone and the removal of the additional outer lens extending over the optics 28 increases overall efficiency. The use of the additional outer lens decreases the transmissivity and efficiency of light, affecting the overall lighting effect 50.

Each optical array 26 can be generally classified according to the National Electrical Manufacturer Association (NEMA) rating system. Accordingly, each optical lens 28 disclosed herein can be classified as a NEMA number value, where the lower NEMA values correlate to narrower beam patterns 32 and higher NEMA values correlate to wider beam patterns 32.

Referring still to FIGS. 4-9, the first optical array 26*a* is illustrated. This optical array 26*a* is generally classified as similar to a NEMA 2, which provides the narrowest beam pattern 32 of the configurations disclosed herein. The first row 90*a* (i.e., the top row 90*a*) of optical lenses 28 and outermost optical lenses 28 of the second row 90*b* include the same or similar optical face 94 in the same orientation. Each of these optical lenses 28 includes the revolved inverted conical face 136, which is partially elevated from the base surface 96. The vertex is disposed adjacent to the outer edge of the optical face 94 at a top of the optical lens 28 (generally a 12 o'clock position), which is generally a zero-degree rotational position of the optical face 94. Additionally, each of these optical faces 94 defining the inverted conical face 136 are slanted with the vertex being aligned with the base surface 96 and a bottom edge of the conical face 136 extending the furthest from the base surface 96.

The remaining optical lenses 28, including the middle three optical lenses 28 in the second row 90*b* and each of the optical lenses 28 in the third through sixth rows 90*c*-90*f*, include the flat lens 130 configuration of the light directing surface 94. The flat lenses 130 are generally co-planar with the base surface 96.

Figure 5:
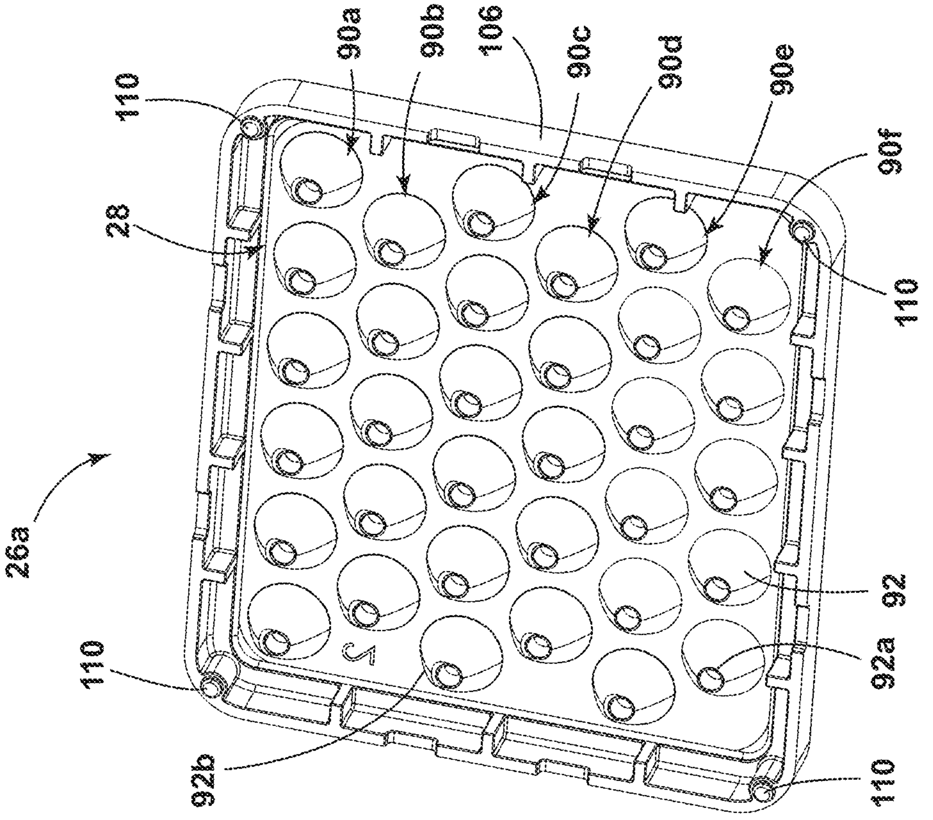
FIG. 5 is a rear perspective view of the first optical array of FIG. 4, illustrating light guiding bodies of the optical lenses, according to the present disclosure.
Figure 4:
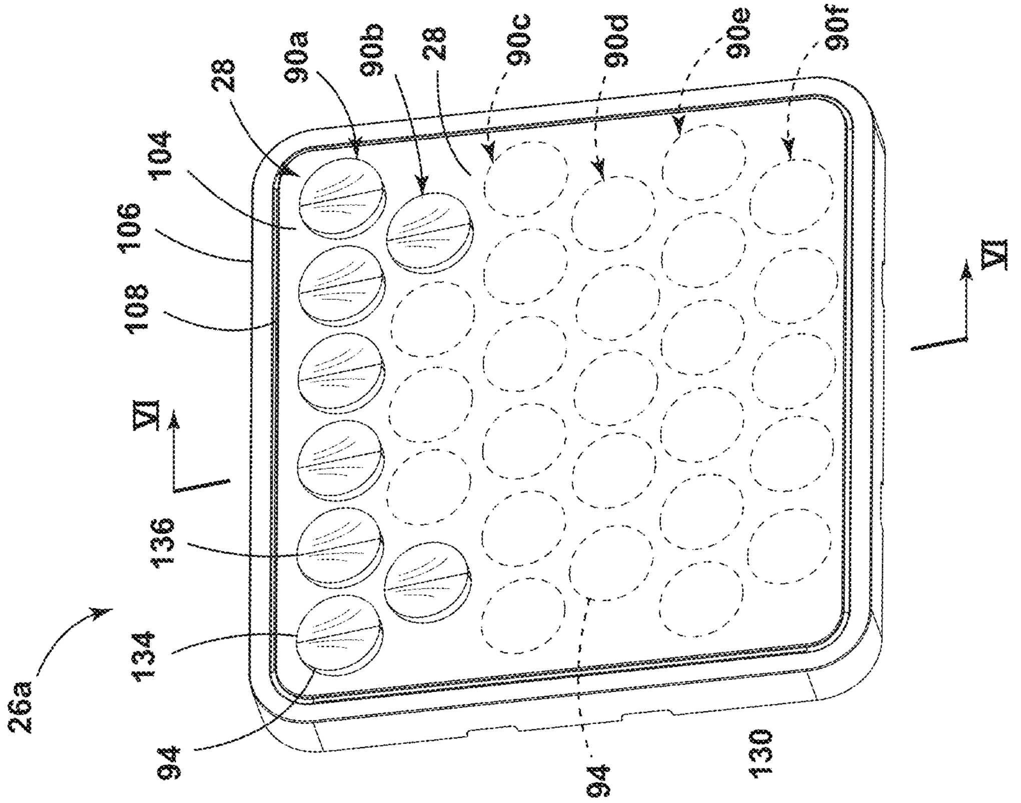
FIG. 4 is a front perspective view of a first optical array with optical lenses, according to the present disclosure.
Figure 6:
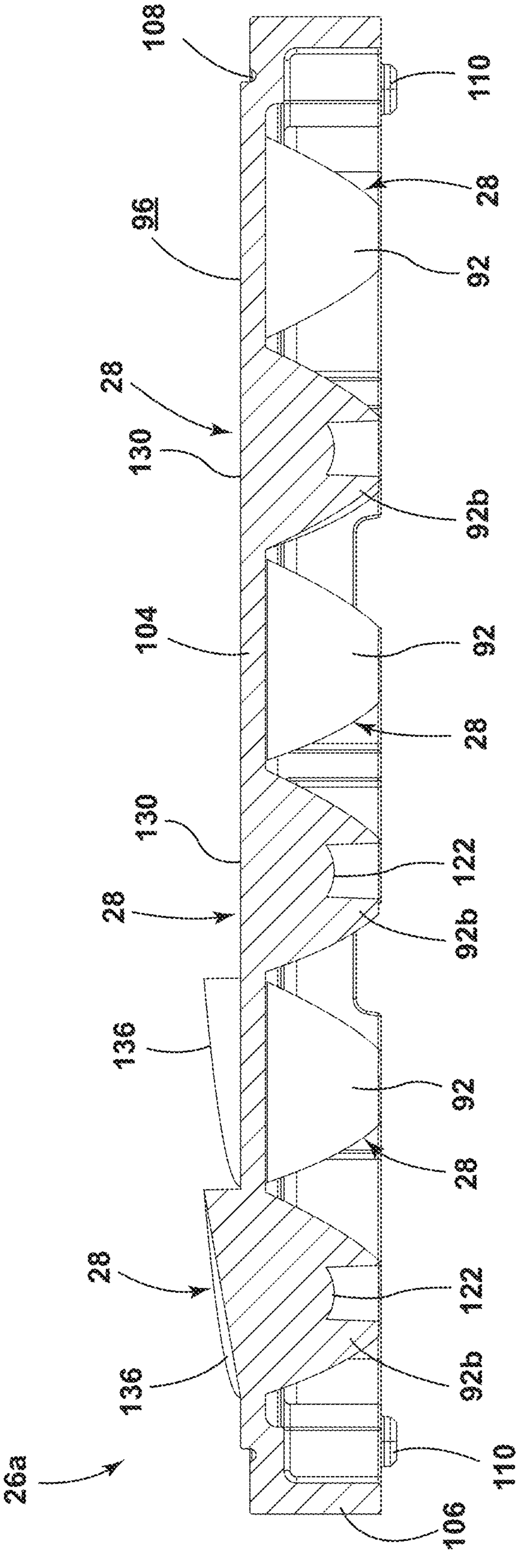
FIG. 6 is a cross-sectional view of the first optical array of FIG. 4, taken along the lines VI-VI, according to the present disclosure.

In addition to different optical faces 94, the first optical array 26*a* also includes a combination of symmetrical and non-symmetrical light guiding bodies 92*a*, 92*b*. The non-symmetrical light guiding bodies 92*b* can be non-symmetrical relative to at least a horizontal plane through each optical lens 28, having a top or upper portion with the increased thickness. As illustrated in FIG. 5, each optical lens 28 in the first through fourth rows 90*a*-90*d* of optical lenses 28 and the outermost optical lenses 28 of the fifth row 90*e* define the non-symmetrical light guiding bodies 92*b*. Further, each non-symmetrical configuration has the thickened top portion of the light guiding body 92*b*, corresponding with a zero-degree rotational position of the light guiding bodies 92*b*.

Moreover, each thickened portion is substantially similar in shape, thickness, and direction relative to the cavity. The thickened portions have a more oblong or square shape extending relative to the cavity. The thickened portion may have an outer edge that is about 10.5 mm and extends an additional distance of up to about 0.9 mm from the cavity proximate to the circuit board 18. The symmetrical light guiding body 92*a* defines an outer circumference of about 17 mm where the optical lens 28 engages the circuit board 18. The additional distance of the thickened portion creates an extension from the outer circumference.

The orientation of the thicker portion relative to the aiming axis 120 contributes to the focus or direction of the light being moved using the center beam intensity separate from the configuration of the optical face 94. In this way, the optical lenses 28 may minimize efficiency loss that is generally associated with thicker optic cross-sections or radii on the optical face 94 that are used to bend light. The configuration of the non-symmetrical light guiding bodies 92*b* in the illustrated configuration may move light in a downward direction from the center beam intensity.

The middle four optical lenses 28 of the fifth row 74*e* and all the optical lenses 28 in the sixth row 74*f* have the symmetrical light guiding bodies 92*a*. Accordingly, the first optical array 26*a* includes three configurations of optical lenses 28, including non-symmetrical light guiding bodies 92*b* with the revolved inverted conical face 136, non-symmetrical light guiding bodies 92*b* with the flat lens 130, and symmetrical light guiding bodies 92*a* with the flat lens 130. Moreover, each optical lens 28 defines the internal TIR lens 122.

Figure 11:
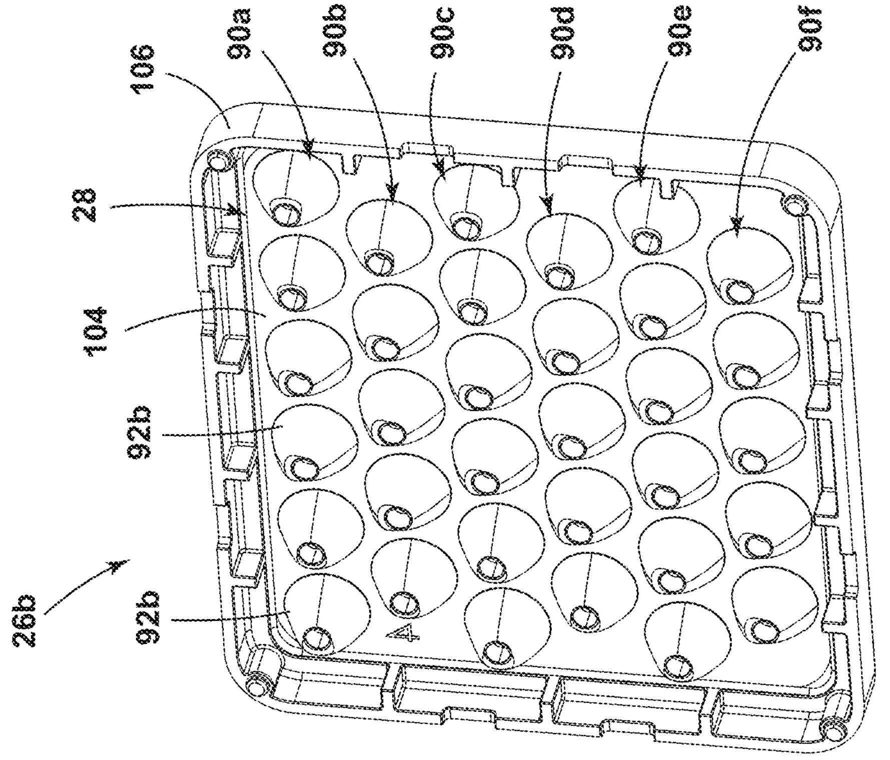
FIG. 11 is a rear perspective view of the second optical array of FIG. 10, illustrating light guiding bodies of the optical lenses, according to the present disclosure.
Figure 10:
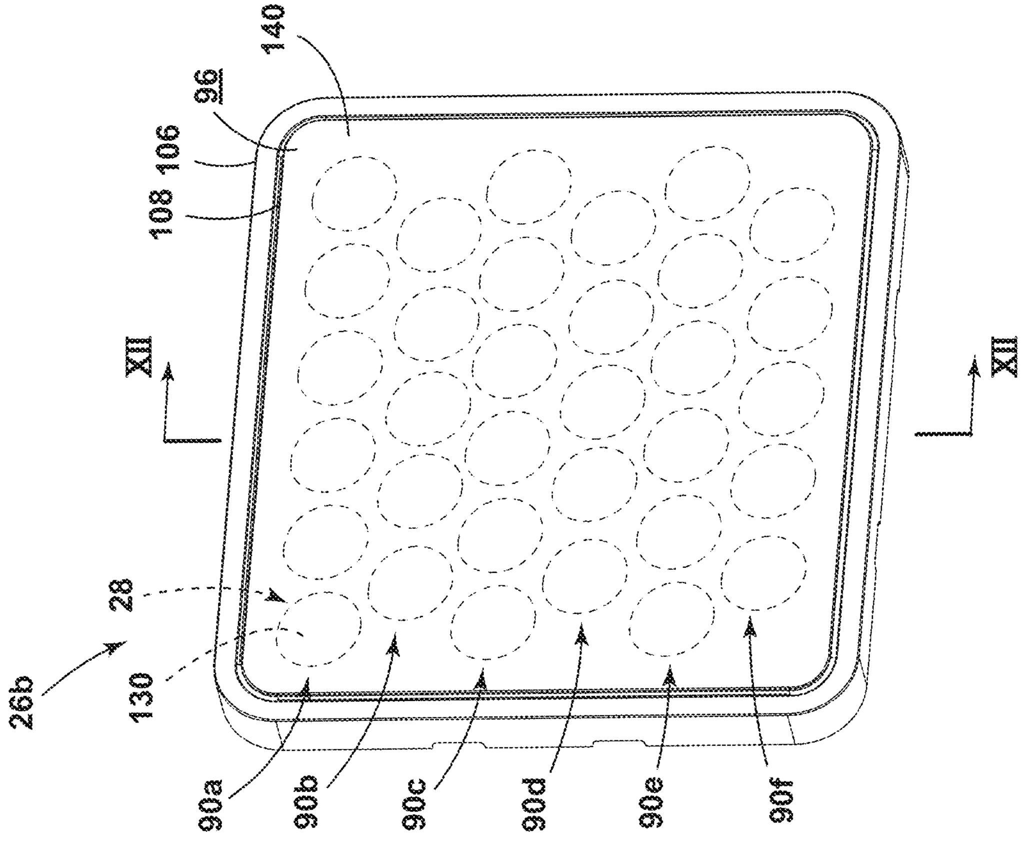
FIG. 10 is a front perspective view of a second optical array with optical lenses, according to the present disclosure.
Figure 12:
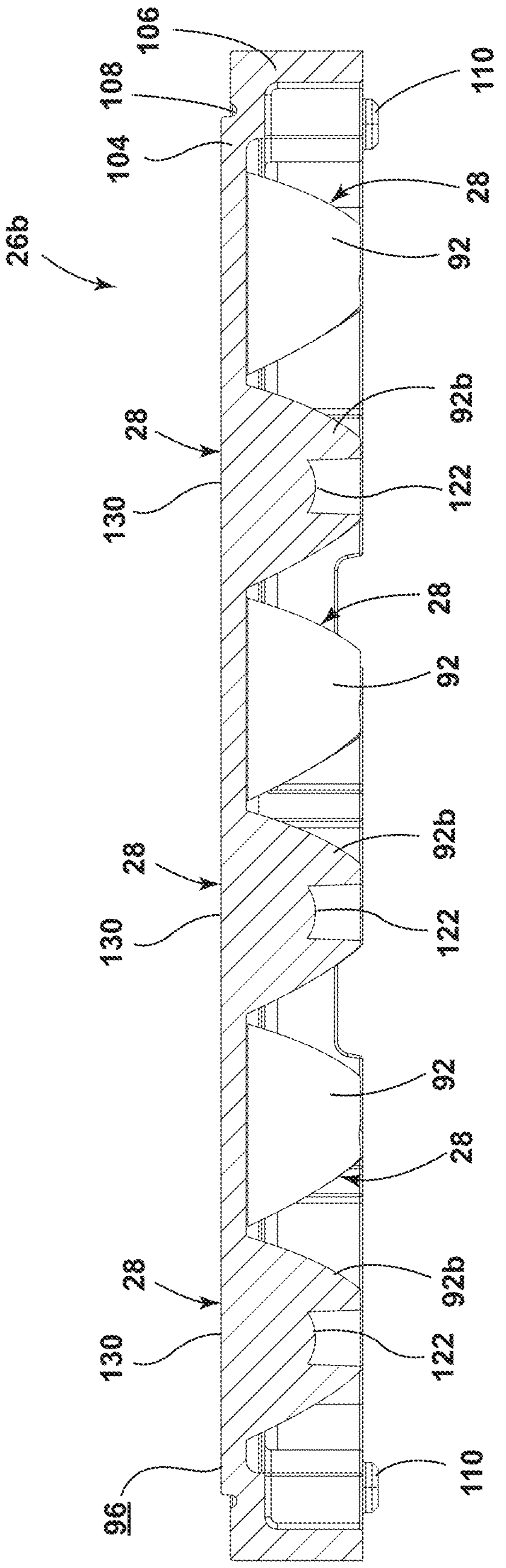
FIG. 12 is a cross-sectional view of the second optical array of FIG. 10, taken along the lines XII-XII, according to the present disclosure.

Referring to FIGS. 10-12, the second optical array 26*b* is illustrated, which is generally classified as similar to a NEMA 4. The NEMA 4 optical array 26*b* produces a wider beam pattern 32 compared to the NEMA 2 optical array 26*a* (FIG. 4) and generally produces an oblong or oval beam pattern 32. Each optical lens 28 in the second optical array 26*b* includes the flat lens 130, co-planar with the base surface 96. Accordingly, an outer side of the second optical array 26*b* appears as a single, flat surface within the groove 108.

Each light guiding body 92 in the second optical array 26 is non-symmetrical. Some of the light guiding bodies 92*b* are non-symmetrical relative to at least a horizontal plane (having an upper or lower side with an increased thickness), and some of the light guiding bodies 92*b* are non-symmetrical relative to at least a vertical plane (having a left or right side with an increased thickness). In the first row 90*a* of optical lenses 28, the outer four optical lenses 28 have increased thickness at an outer side, being rotated +/−90° relative to the aiming axis 120, which generally directs the light inward. The middle two optical lenses 28 are at the zero-degree rotational position, having thickened portions at the top side to generally direct light down. The outermost optical lenses 28 and the center two optical lenses 28 in the first row 90*a* have greater thicker portions, having an outer edge of about 12 mm and extending an additional distance of about 1.3 mm, than the remaining two optical lenses 28, having an outer edge of about 10.5 mm and extending an additional distance of about 0.9 mm.

Additionally, in the first row 90*a*, the two outer optical lenses 28 on one side of the array 26*b* are rotated about 90° relative to the aiming axis 120, and the opposing two outer optical lenses 28 are rotated about −90° relative to the aiming axis 120. The middle optical lenses 28 are positioned at about 0° relative to the aiming axis 120. The third row 90*c* of optical lenses 28 has a substantially similar configuration.

In the second row 90*b* of optical lenses 28, the outermost optical lenses 28 are rotated +/−90° having outer sides with the increased thickness. The middle three optical lenses 28 have a top side with the increased thickness, being positioned at the zero-degree rotational position. The thickened portion of the middle three optical lenses 28 is greater than the outer optical lenses 28, with similar sizing as those described in the first row 90*a*. The difference in thickness of the thickened portions affects how much the light is moved using the center beam intensity. The fourth row 90*d* of the optical lenses 28 has a substantially similar configuration.

In the fifth row 90*e* of the optical lenses 28, the outer optical lenses 28 have increased thicknesses at the outer sides, being rotated +/−90°, while the middle four optical lenses 28 have increased thicknesses at the top side, being at the zero-degree rotational position. The top sides of the middle fourth optical lenses 28 have a greater thickness compared to the outer sides of the outer optical lenses 28. These size differences are similar to those described in the first row 90*a*. In the sixth row 90*f*, each optical lens 28 has an increased thickness at a top portion and each increased thickness is substantially similar, which is the greater thickness.

The second optical array 26*b* includes three configurations of the optical lens 28, which include the flat lens 130 in combination with a side thickened portion of a first thickness, a side thickened portion of the second thickness, a top thickened portion of a first thickness, and a top thickened position of a second thickness. Additionally, the optical lenses 28 are positioned at three rotational positions, including about 0°, about 90°, and about −90° relative to the aiming axis 120. Accordingly, the second optical array 26*b* can move the light in various directions and various angles in those directions using the light guiding bodies 92 to form the beam pattern 32.

Referring to FIGS. 13-16, the third optical array 26*c* illustrated, which is generally classified similar to a NEMA 4 or NEMA 5, and may be referred to herein as a NEMA 4 W. This optical array 26*c* forms a similar sized beam pattern 32 as the NEMA 4 (FIGS. 10-12), though the shape of the beam pattern 32 differs. The beam pattern 32 generated by the third optical array 26*c* is generally a triangular shape rather than an oblong shape. The third optical array 26*c* includes six different rows 90 of optical lenses 28. In the first row 90*a*, the third optical array 26*c* includes an asymmetrical arrangement with one outer optical lens 28 on one side and two outer optical lenses 28 on the opposing side having the slanted inverted conical face 136 with the vertex at the top edge of the optical face 94 (i.e., the zero-degree rotational position).

The remaining three optical lenses 28 in the first row 90*a* include the Fresnel style lens 132, where each ridge 140 is defined by a slanted or angled top surface and a bottom surface generally perpendicular to the base surface 96, which is a zero-degree rotational position. Each groove 142 defines an angle of about 60° between adjacent ridges 140, with the ridges 140 extending about 2 mm from the base surface 96, which is generally the first configuration of the Fresnel style lens 132*a*. The ridges 140 and grooves 142 form a uniform pattern from top-to-bottom on the corresponding optical lenses 28. Each optical lens 28 in the first row 90*a* is at a rotational position of about 0°. The ridges 140 have a consistent height relative to the base surface 96, and the grooves 142 extend to points that generally align with the base surface 96. In the second and fourth rows 90*b*, 90*d* of optical lenses 28, the outermost optical lenses 28 have the slanted inverted conical face 136 at about the 0° rotational position. The middle three optical lenses 28 have the flat lens 130. In the third row 90*c*, each optical lens 28 has the slanted inverted conical face 136 with the vertex at the top of the optical face 94 for the zero-degree rotational position. In the fifth row 90*e*, the two outer optical lenses 28 on each side include the slanted inverted conical face 136 with the vertex at the top of the optical face 94, and the middle two optical lenses 28 have the flat lens 130. In the sixth row 90*f*, each optical lens 28 has the flat lens 130.

The third optical array 26*c* also includes symmetrical and non-symmetrical light guiding bodies 92*a*, 92*b*, with each non-symmetrical light guiding body 92*b* being at the zero-degree rotational position with the thickened top portion. The thickened portions in this configuration have a greater thickness than in the previous configurations. For example, an outer edge of the thickened portion is about 15.4 mm and extends an additional distance of about 2.1 mm. The optical lenses 28 having the slanted inverted conical faces 136 each have the non-symmetrical light guiding body 92*b*. The optical lenses 28 having the Fresnel style lens 132 have the symmetrical light guiding body 92*a*. The flat lenses 130 in the second and fourth rows 90*b*, 90*d* have the non-symmetrical light guiding body 92*b*, while the flat lenses 130 in the fifth and sixth rows 90*e*, 90*f* have the symmetrical light guiding body 92*a*.

Accordingly, the third optical array 26*c* includes four configurations of the optical lens 28, includes the Fresnel style lens 132*a* with the symmetrical light guiding body 92*a*, the slanted inverted conical face 136 with the non-symmetrical light guiding body 92*b*, the flat lens 130 with the symmetrical light guiding body 92*a*, and the flat lens 130 with the non-symmetrical light guiding body 92*b*. The different combinations can move light more, such as with the Fresnel style lens 132, in certain areas, and move the light less or not at all, such as with the flat lens 130 and the symmetrical light guiding body 92*a*, in other areas to form the triangular beam pattern 32.

Figure 15:
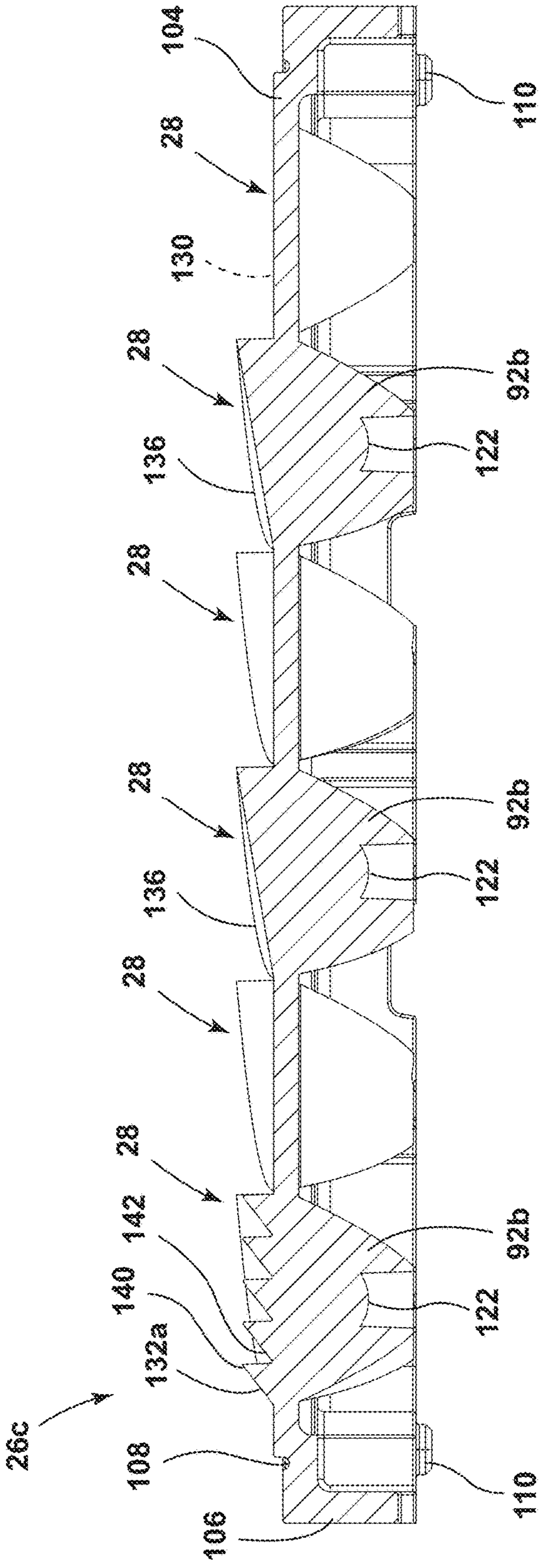
FIG. 15 is a cross-sectional view of the third optical array of FIG. 13, taken along the lines XV-XV, according to the present disclosure.

As illustrated in FIG. 15, the non-symmetrical light guiding body 92*b* of the third optical array 26*c* is substantially thicker on one side compared to the opposing side, which also affects the angle of the side surface of the light guiding body 92. The increased thickness reduces the angle or curvature of the side surface relative to the aiming axis 120 compared to the thinner side of the light guiding body 92. The angle of the side surface at the thickened portion and at the thinner portion is less than 45° relative to the aiming axis 120. In this way, the angle of the side surfaces may range from about 0° to about 45°. The closer to the 45° angle, the more the light bends within the optical lens 28 but is still directed through the light directing surface 94 rather than scattering through the backside of the optical array 26.

Figure 14:
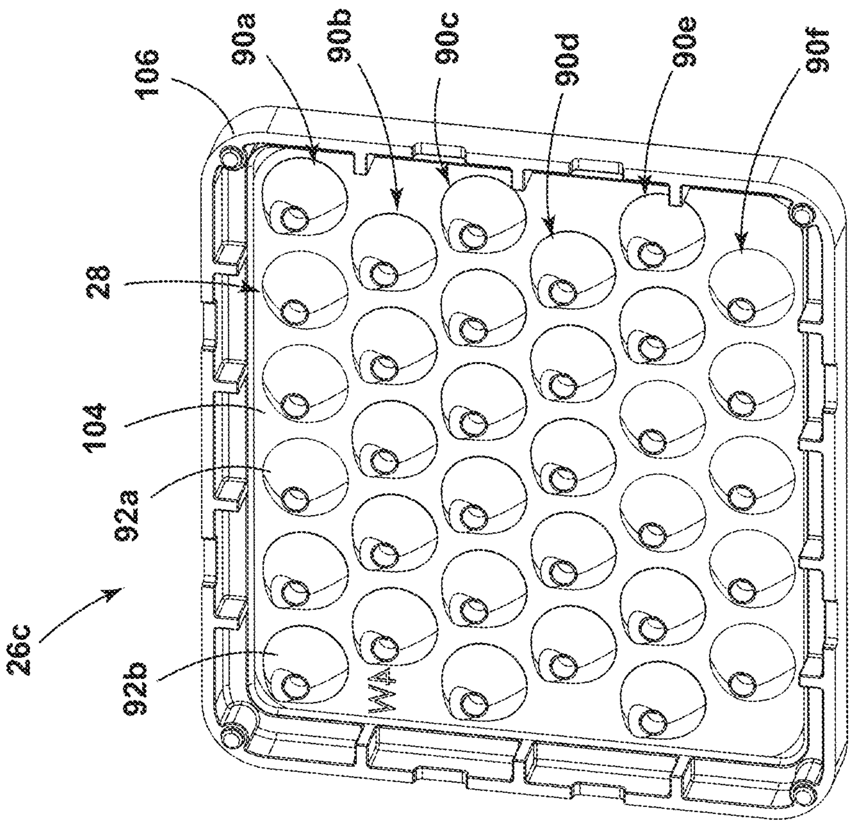
FIG. 14 is a rear perspective view of the third optical array of FIG. 13, illustrating light guiding bodies of the optical lenses, according to the present disclosure.
Figure 13:
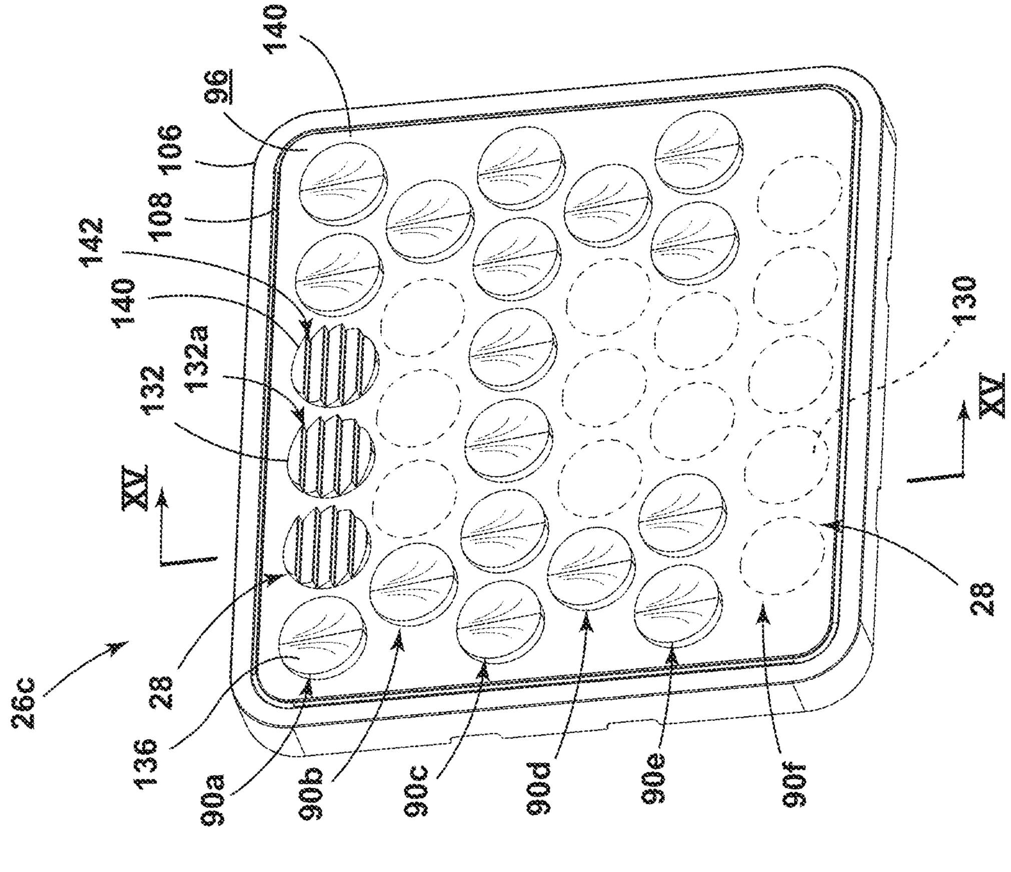
FIG. 13 is a front perspective view of a third optical array with optical lenses, according to the present disclosure.

Referring to FIGS. 17-20, the fourth optical array 26*d* is illustrated, which is generally classified similar to a NEMA 5, having a wider beam pattern 32 than the NEMA 2 (FIGS. 4-9), NEMA 4 (FIGS. 10-12), and NEMA 4 W (FIGS. 13-15). Accordingly, the optical lenses 28 included in the fourth optical array 26*d* are configured to direct the beams of light into a broader overall beam, moving the "spotlights" to spread the beam pattern 32. The movement of the light is generally accomplished by using optical lenses 28 with configurations that move or bend the light to a greater degree to spread the "spotlights" about a greater area.

In the illustrated configuration, the fourth optical array 26*d* includes optical lenses 28 having Fresnel style lenses 132 and the slanted inverted conical face 136. Moreover, in order to spread or move the narrow light beams, the optical faces 94 of the Fresnel style lenses 132 are at different rotational positions relative to the aiming axis 120. Overall, upper and side optical lenses 28 include the Fresnel style lenses 132, and lower and center optical lenses 28 include the slanted inverted conical face 136.

The first row 90*a* of optical lenses 28 includes the first configuration of the Fresnel style lenses 132*a*. The outermost optical lenses 28 are each rotated, with one rotated about −45° and the opposing one rotated about 45° to spread the light outward at upward angles. The middle four optical lenses 28 are at a zero-degree rotational position. Each of the Fresnel style lenses 132*a* in the first row 90*a* has a slanted or angled upper face on each ridge 140 and a lower surface perpendicular to the circuit board 18 for the lower surfaces. The angle defined by each groove 142 is about 60°, and each ridge 140 extends about 2 mm from the base surface 96.

In the second row 90*b* of optical lenses 28, the middle optical lens 28 includes the slanted inverted conical face 136 with the vertex being at the top edge and the highest point being at the bottom edge, vertically aligned with the vertex (i.e., the zero-degree position). The optical lenses 28 on either side of the middle optical lens 28 include the second configuration of Fresnel style lens 132*b* at the zero-degree rotational position. The inner Fresnel style lenses 132*b* have grooves 142 defining an angle of about 66°, and the ridges 140 extend about 1.5 mm from the base surface 96. The outermost optical lenses 28 are the third configuration of the Fresnel style lenses 132*c* that are each rotated, with one side being rotated −90° and the opposing side being rotated 90° to spread the light outward. The 90° rotation clockwise or counterclockwise results in ridges 140 with an outer slanted or angled surface and an inner surface generally perpendicular to the circuit board 18. The outer Fresnel style lenses 132*c* have grooves 142 that define an angle of about 75° and have ridges 140 extending between about 0.5 mm and about 0.75 mm from the base surface 96. The difference in the ridges 140 and grooves 142 changes the focus of the light beam.

The third and fifth rows 90*c*, 90*e* have substantially similar configurations. The outer two optical lenses 28 on each side are Fresnel style lenses 132*a*, 132*b*, respectively. The Fresnel style lenses 132 on the first side are rotated about −90° and the opposing side are rotated about 90° to spread the light outward. The outermost Fresnel style lenses 132*a* have grooves 142 that define an angle of about 60°, and each ridge 140 extends about 2 mm from the base surface 96. The inner Fresnel style lenses 132*b* have grooves 142 defining an angle of about 66° and ridges 140 that extend about 1.5 mm from the base surface 96. Accordingly, the narrow "spotlights" for the outer Fresnel style lenses 132*a* are moved a greater degree from the aiming axis 120 compared to the inner Fresnel style lenses 132*b*. The middle two optical lenses 28 include the slanted inverted conical face 136 at the zero-degree rotational position. The inverted conical face 136 extends from being aligned with the base surface 96 (about 0 mm) to about 3 mm from the base surface 96.

The fourth row 90*d* of optical lenses 28 is similar to the third and fifth rows 90*c*, 90*e* with a different number of optical lenses 28. The fourth row 90*d* includes one center optical lens 28 with the inverted conical face 136 at the zero-degree rotational position. The Fresnel style lenses 132*a*, 132*b* on the first side are rotated about −90°, and Fresnel style lenses 132*a*, 132*b* on the opposing side are rotated about 90° to spread the light outward. The outermost Fresnel style lenses 132*a* have grooves 142 that define an angle of about 60°, and each ridge 140 extends about 2 mm from the base surface 96. The inner Fresnel style lenses 132*b* include grooves 142 that define an angle of about 66°, and the ridges 140 extend about 1.5 mm from the base surface 96.

Figure 19:
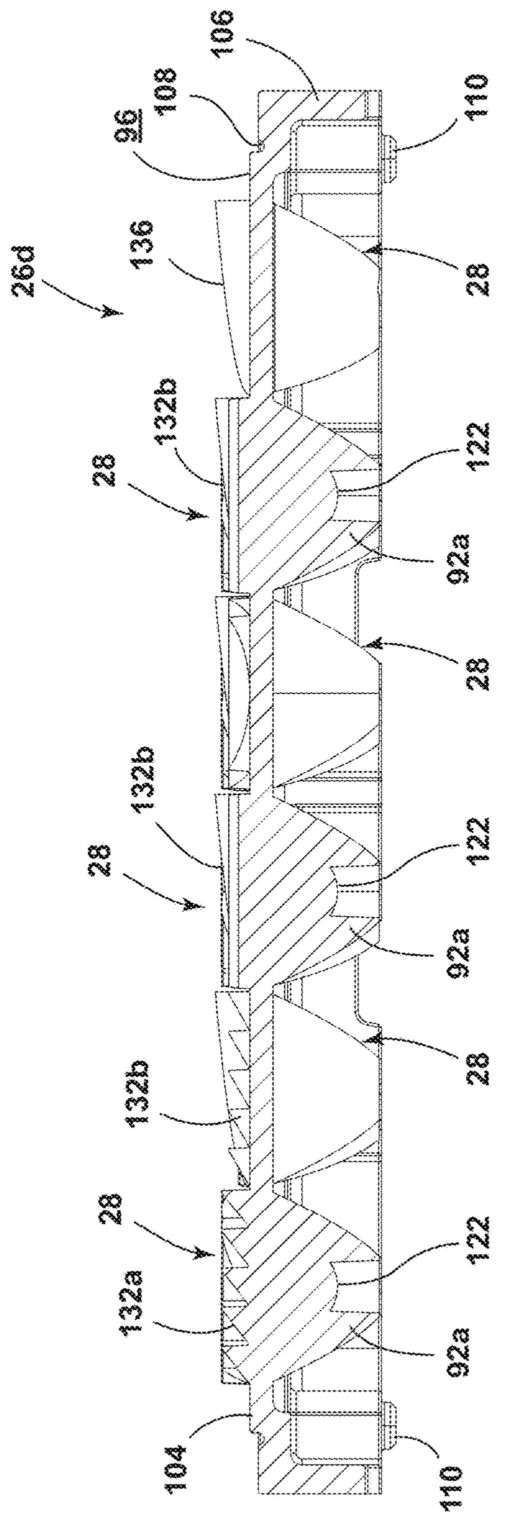
FIG. 19 is a cross-sectional view of the fourth optical array of FIG. 17, taken along the lines XIX-XIX, according to the present disclosure.
Figure 20:
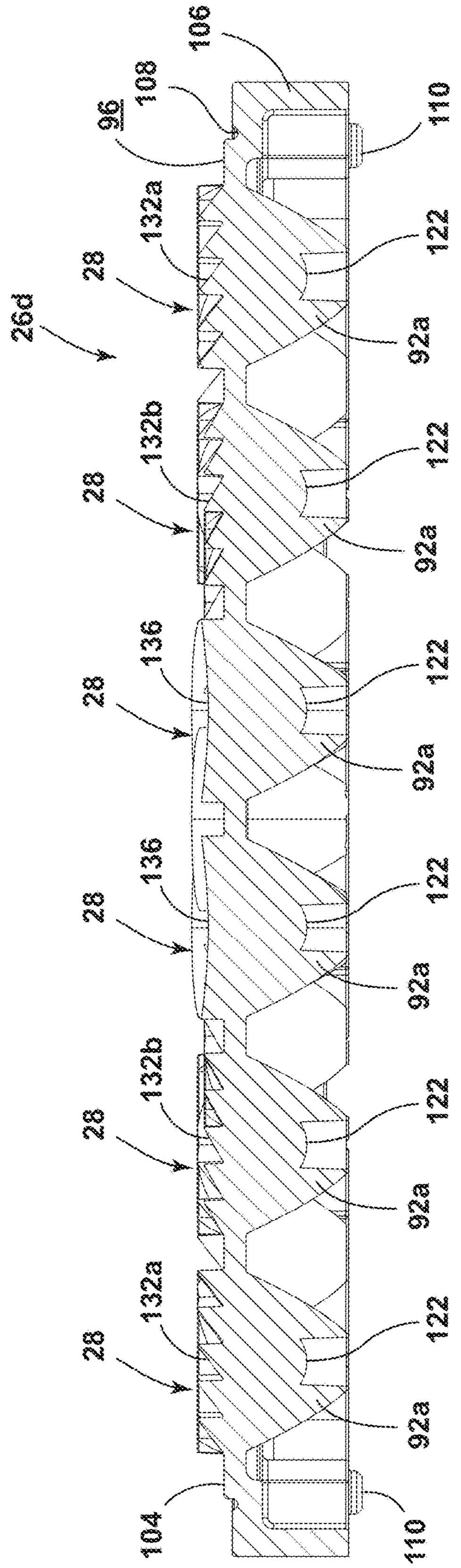
FIG. 20 is a cross-sectional view of the fourth optical array of FIG. 17, taken along the lines XX-XX, according to the present disclosure.
Figure 22:
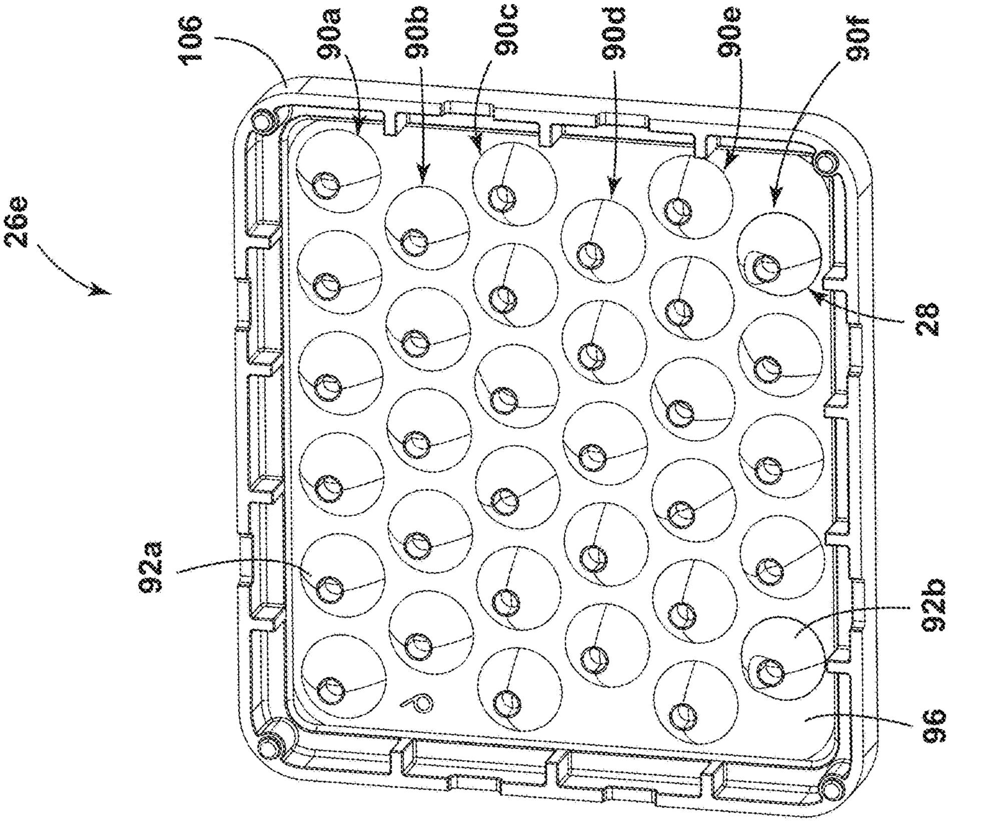
FIG. 22 is a rear perspective view of the fifth optical array of FIG. 21, illustrating light guiding bodies of the optical lenses, according to the present disclosure.
Figure 21:
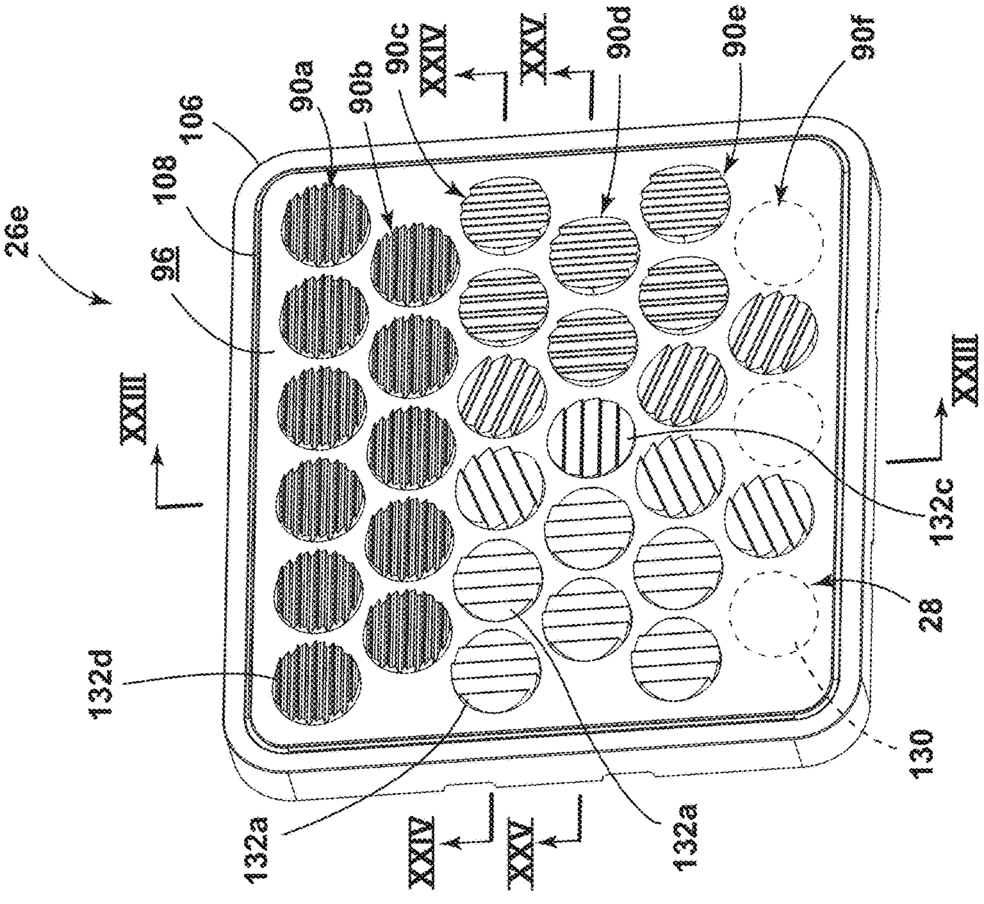
FIG. 21 is a front perspective view of a fifth optical array with optical lenses, according to the present disclosure.
Figure 23:
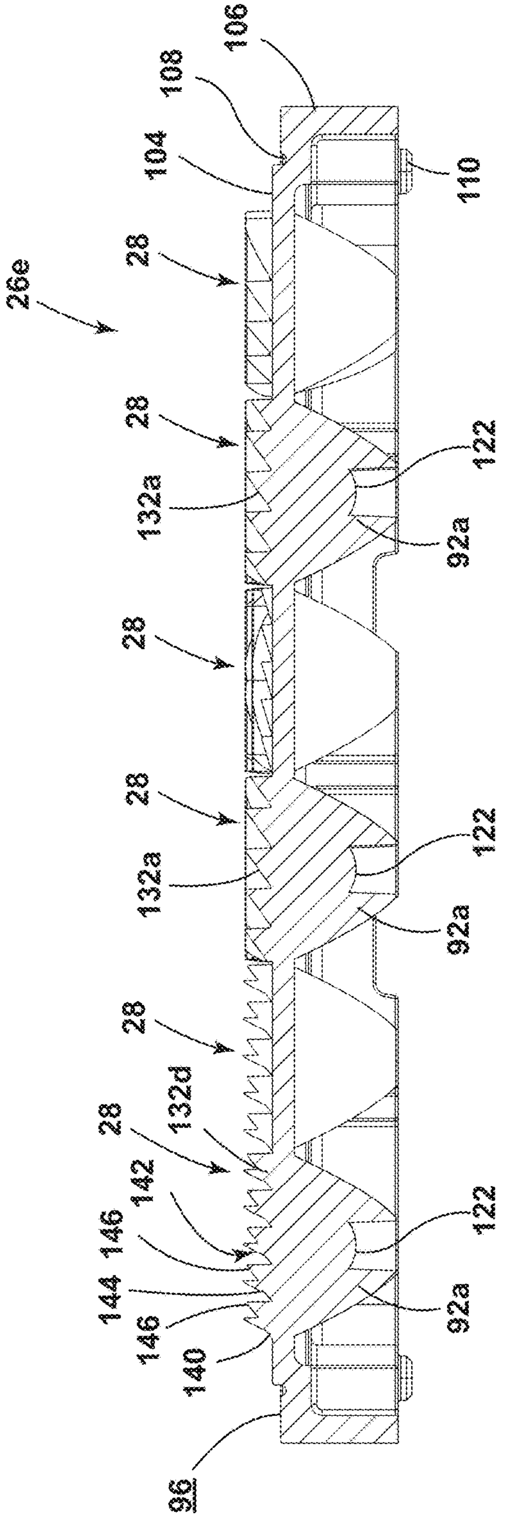
FIG. 23 is a cross-sectional view of the fourth optical array of FIG. 21, taken along the lines XXIII-XXIII, according to the present disclosure.
Figure 24:
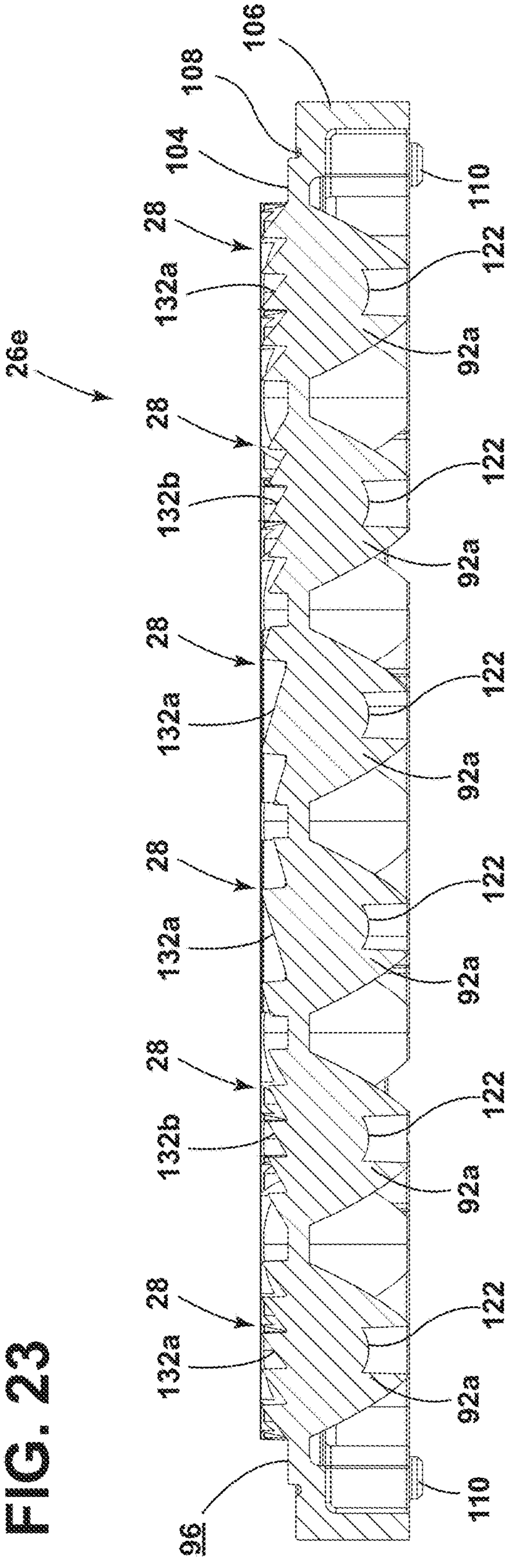
FIG. 24 is a cross-sectional view of the fourth optical array of FIG. 21, taken along the lines XXIV-XXIV, according to the present disclosure.
Figure 25:
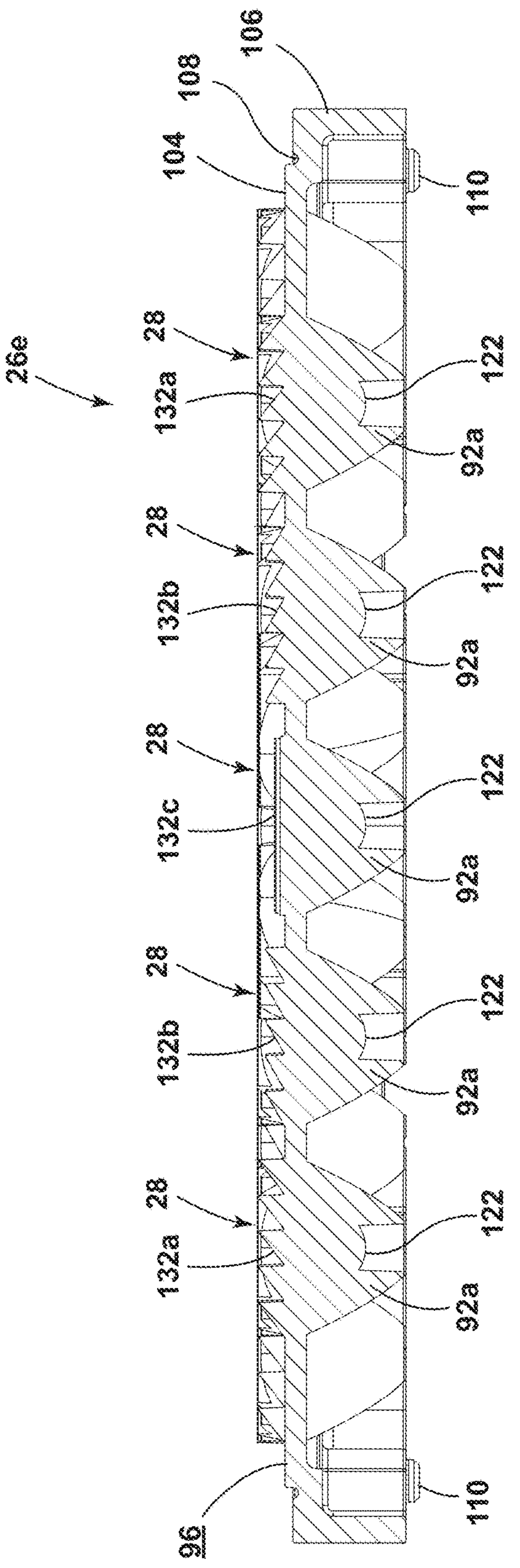
FIG. 25 is a cross-sectional view of the fourth optical array of FIG. 21, taken along the lines XXV-XXV, according to the present disclosure.

The sixth row 90*f* of optical lenses 28 includes each optical lens 28 with the slanted inverted conical face 136 at the zero-degree rotational position. The slanted nature of the inverted conical faces is illustrated in FIG. 19, and the curvature of the inverted conical lenses 134 is illustrated in FIG. 20 relative to the Fresnel style lenses 132. The slanted inverted conical face 136 is not flat or planar but defines radii that extend between the vertex and the outer edge along a perimeter or circumference of the optical face 94. The optical face 94 curves or slopes inward to a center of the optical face 94 and toward the vertex, forming a slanted, off-center, bowl-like shape.

Moreover, the optical lenses 28 in the fourth optical array 26*d* utilize a combination of the symmetrical and non-symmetrical light guiding bodies 92*a*, 92*b*. The non-symmetrical light guiding bodies 92*b* in this configuration are non-symmetrical over at least a respective horizontal plane, having top portions that are thickened (i.e., the zero-degree rotational position). The thickened portions have an outer edge that is about 13.6 mm and extend an additional distance of about 1.7 mm relative to the thinner side proximate to the interface with the circuit board 18. Additionally, each of the non-symmetrical light guiding bodies 92*b* is used in combination with the Fresnel style lens 132 for the light directing surface 94. The symmetrical light guiding bodies 92*a* are used in combination with the slanted inverted conical face 136.

Accordingly, six configurations of the optical lenses 28 are used within this fourth optical array 26*d*, including the symmetrical light guiding body 92*a* with the slanted inverted conical face 136, the non-symmetrical light guiding body 92*b* with the first Fresnel style lens 132*a* (e.g., 60° grooves 142) in the zero-degree rotational position, the non-symmetrical light guiding body 92*b* with the second Fresnel style lens 132*b* (e.g., 66° grooves 142) in the zero-degree rotational position, the non-symmetrical light guiding body 92*b* with the first Fresnel style lens 132*a* in the +/−45° rotational position, the non-symmetrical light guiding body 92*b* with the second Fresnel style lens 132*b* in the +/−90° rotational position, and the non-symmetrical light guiding body 92*b* with the second Fresnel style lens 132*b* in the +/−90° rotational position. Each of these lenses 28 also includes the internal TIR lens 122.

Referring to FIGS. 21-26, the fifth optical array 26*e* is illustrated, which is generally classified similar to a NEMA 6 having the widest beam pattern 32 of the optical arrays 26 described herein. The NEMA 6 optical array 26 produces a generally oval or oblong beam pattern 32 (see FIG. 30). The widening of the beam pattern 32 is accomplished by directing the individual narrow light beams in selected directions and at selected angles relative to the aiming axis 120 to widen the beam pattern 32. The first two rows 90*a*, 90*b* of optical lenses 28 include a fourth configuration of the Fresnel style lens 132*d*, each positioned at a zero-degree rotational position. The Fresnel style lens 132*d* includes the primary ridges 140 and grooves 142 as well as the secondary ridges 146 and secondary grooves 144 defined by each primary ridge 140, as illustrated in FIG. 26. The primary ridges 140 extend about 3 mm from the base surface 96. The upper slanted surfaces have three portions, with a first portion extending for about 1 mm and defining an angle between about 55° and about 60° with the lower surface of the adjacent primary ridge 140. The upper slanted surface then extends about 1.3 mm at an angle of between about 150° and about 155° relative to the first portion. A third portion of the upper slanted surface then extends about 0.8 mm at an angle between about 175° relative to the second portion. The lower surface of each primary ridge 140 extends generally perpendicular to the circuit board 18.

The secondary ridges 146 form two projections separated by the secondary groove 144 within each primary ridge 140. The slanted upper surface of the primary ridge 140 forms the upper surface of the first secondary ridge 146. A lower surface of the first secondary ridge 146 is generally perpendicular to the circuit board 18 and extends about 1 mm into the primary ridge 140. The lower surface of the second secondary ridge 146 is formed by the lower surface of the primary ridge 140. The upper surface of the second secondary ridge 146 has a first portion that extends about 1 mm and defines an angle between about 60° and about 65° with the lower surface of the first secondary ridge 146, and a second portion that extends about 1 mm at an angle of about 175° relative to the first portion. Accordingly, the upper surfaces of the primary and secondary ridges 140, 146 have different angles for changing the direction of the light beam. Moreover, the additional angled or slanted surfaces assist in moving the light beam a greater degree relative to other styles of the light directing surface 94. It is also contemplated that the upper surfaces of the primary and secondary ridges 140, 146 may not have different portions, but extend at a single angle without departing from the teachings herein.

In the third and fifth rows 90*c*, 90*e* of optical lenses 28, the optical lenses 28 include the Fresnel style lenses 132*a*, 132*b* for the optical face 94. The outer two optical lenses 28 on each side are rotated +/−90° relative to the aiming axis 120, respectively, to direct the light outward. The outermost optical lenses 28 are the first configuration of the Fresnel style lenses 132*a* with the ridges 140 extending about 2 mm from the base surface 96 and the grooves 142 defining an angle of about 60°. The optical lenses 28 adjacent to the outermost lenses 28 are the second configuration of the Fresnel style lenses 132*b*, with the ridges 140 extending about 1.5 mm from the base surface 96 and the grooves 142 defining an angle of about 66° between adjacent ridges 140. The middle two optical lenses 28 are positioned at +/−45°, respectively, to direct light outward and upward. Each of these middle optical lenses 28 is the first configuration of the Fresnel style lenses 132*a* with the ridges 140 extending about 2 mm from the base surface 96 and the grooves 142 defining an angle of about 60°.

The fourth row 90*d* of optical lenses 28 also includes all Fresnel style lenses 132 for the optical face 94. The outer two optical lenses 28 on each side are rotated +/−90° relative to the aiming axis 120, respectively, to direct the light outward. The outermost optical lenses 28 are the first configuration of the Fresnel style lenses 132*a* with the ridges 140 extending about 2 mm from the base surface 96 and the grooves 142 defining an angle of about 60°. The optical lenses 28 adjacent to the outermost optical lenses 28 are the second configuration of the Fresnel style lenses 132*b*, with the ridges 140 extending about 1.5 mm from the base surface 96 and the grooves 142 defining an angle of about 66° between adjacent ridges 140. The center optical lens 28 is at a zero-degree rotational position and is the third configuration of the Fresnel style lens 132*c*, having grooves 142 defining angles of about 75° with the adjacent ridges 140 and the ridges 140 extending between about 0.5 mm and about 0.75 mm from the base surface 96.

In the sixth row 90*f* of the optical lenses 28, the outermost optical lenses 28 and the center optical lens 28 each have the flat lens 130 for the optical face 94. The remaining two optical lenses 28 are Fresnel style lenses 132*a* at +/−45°, respectively, to direct light upward and outward. These Fresnel style lenses 132*a* are the first configuration of the Fresnel style lenses 132*a* with the ridges 140 extending about 2 mm from the base surface 96 and the grooves 142 defining an angle of about 60°.

Moreover, the fifth optical array 26*e* includes a combination of symmetrical and non-symmetrical light guiding bodies 92*a*, 92*b*. The two outermost optical lenses 28 in the sixth row 90*f* include the non-symmetrical light guiding bodies 92*b* with a thickened top portion (the zero-degree rotational position). The thickened portion has an outer edge of about 13.2 mm and extends an additional distance of about 1.7 mm. The remaining optical lenses 28 have symmetrical light guiding bodies 92*a*. Accordingly, the fifth optical array 26*e* includes seven configurations of optical lenses 28, including the flat lens 130 with the non-symmetrical light guiding body 92*b*, the flat lens 130 with the symmetrical light guiding body 92*a*, the first Fresnel style lens 132*a* in the +/−45° rotational position with the symmetrical light guiding body 92*a*, the first Fresnel style lens 132*a* in the +/−90° rotational position with the symmetrical light guiding body 92*a*, the second Fresnel style lens 132*b* in the +/−90° rotational position with the symmetrical light guiding body 92*a*, the third Fresnel style lens 132*c* in the +/−90° rotational position with the symmetrical light guiding body 92*a*, and the fourth configuration of the Fresnel style lens 132*d* (e.g., with primary and secondary grooves 144 and ridges 146) in the zero-degree rotational position.

Referring again to FIGS. 4-26, each of the optical arrays 26 herein provides a selected beam pattern 32 based on the selection and orientation (i.e., rotational position) of the optical lenses 28 in the specific optical array 26. The optical arrays 26 may generate a narrower beam pattern 32, such as with the NEMA 2 configuration, the triangular-shaped being pattern, such as with the NEMA 4 W configuration, or a wider beam pattern 32, such as the NEMA 6 configuration. The narrower beam patterns 32 may concentrate the light beams to form a more intense beam pattern 32, whereas the wider beam patterns 32 may spread or disperse the light beams to form the larger beam patterns 32.

Whether the beam pattern 32 is narrow, wide, oval, triangular, etc., each beam pattern 32 herein is a combination of 33 "spotlights" that have a base beam width of less than 11 degrees. The spreading of the beam pattern 32 does not spread the "spotlights" much beyond the 11-degree size. Accordingly, to form the larger beam patterns 32, the light is not spread by the optics 28 but is tilted or moved, generally maintaining the width of each optic light beam of less than 11 degrees. This configuration provides the selected beam pattern 32 having increased efficiency by utilizing multiple "spotlights" focused in predefined directions to form the beam pattern 32 rather than spreading light from the LEDs 20 to encompass the target area 12. The optical lenses 28 are utilized to move the light relative to the aiming axis 120. The "spotlights" increase the strength of the light across the beam pattern 32 and contains the light, reducing glare and light scatter. The selection of the light guiding body 92, the location of the thickened portion for the non-symmetrical light guiding bodies 92*b*, the selection of the optical faces 94, and the rotational position of the optical faces 94 are all considered and specifically selected to form the selected beam pattern 32 for each array 26.

Figure 27:
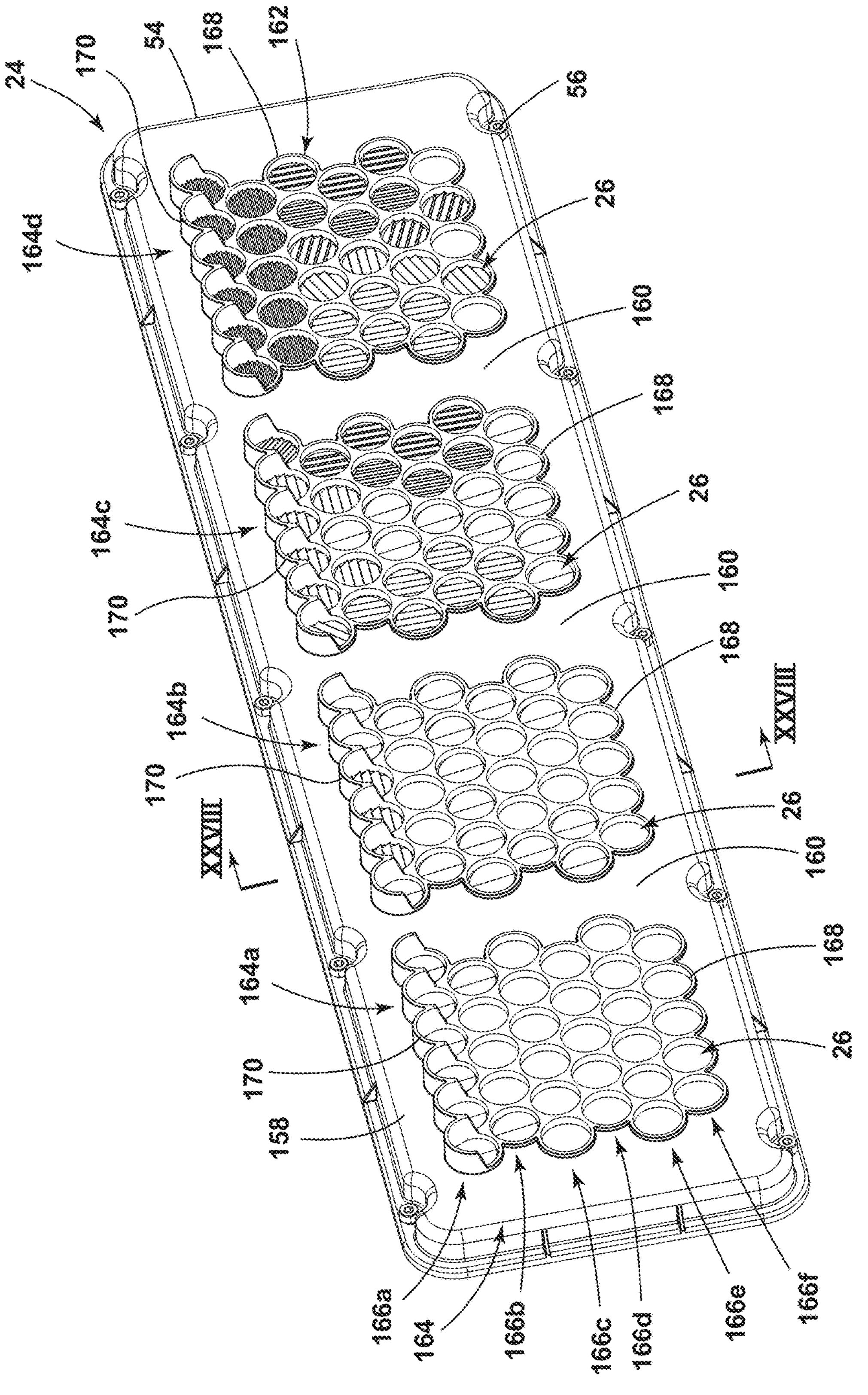
FIG. 27 is a side perspective view of a bezel disposed over an optical system for a lighting assembly, according to the present disclosure.
Figure 28:
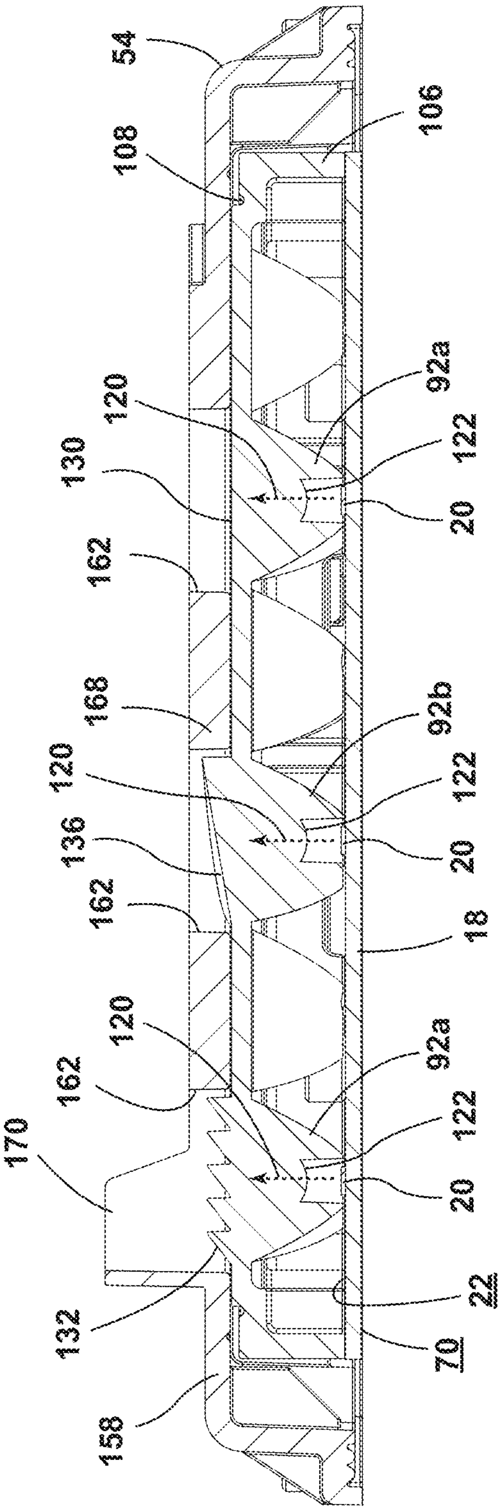
FIG. 28 is a cross-sectional view of the bezel and the optical system of FIG. 27, taken along lines XXVIII-XXVIII, according to the present disclosure.

Referring to FIGS. 27 and 28, the selected optical arrays 26 are each disposed on the circuit board 18 over one grouping 30 of LEDs 20, where each optical lens 28 corresponds with a single LED 20 that is centrally aligned within the TIR lens 122 of the light guiding body 92. The lighting assembly 16 includes four optical arrays 26, each having 33 optical lenses 28 corresponding to the 33 LEDs 20 on the single circuit board 18. Accordingly, each lighting assembly 16 includes 132 LEDs 20 and 132 optical lenses 28, which form 132 "spotlights" per circuit board 18 used to create the composite beam 34. In this way, each optical array 26 forms the selected beam pattern 32, which are combined together to form the composite beam 34 produced by the lighting assembly 16. Each of the beam patterns 32 of the optical arrays 26 for the composite beam 34 may be the same, different, or combination thereof based on the selected optical arrays 26 and the optical lenses 28 included in those optical arrays 26.

In the example illustrated in FIG. 27, the lighting assembly 16 includes four different optical arrays 26 on one circuit board 18. Each optical array 26 includes a different configuration and arrangement of the optical lenses 28 to produce four different beam patterns 32 that combine to form the composite beam 34 for the lighting assembly 16. As illustrated, each light guiding body 92 forms a generally frustro-conical shape, and each light directing surface 94 forms a circular or oblong shape.

The lighting assembly 16 also includes the bezel 54, which is disposed over the optical system 24 as generally described herein. The bezel 54 generally defines an outer perimeter portion 158, which forms a rectangular shape that surrounds the optical system 24, and dividing portions 160, which extend between optical arrays 26 of the optical system 24. In various configurations, the bezel 54 also extends over the base surface 96, which may be advantageous for reducing glare by minimizing or preventing visibility of any light within the optical system 24 outside of the light emitted through the light directing surfaces 94. In various aspects, the bezel 54 is substantially or entirely opaque, such as being a dark color like black. This reduces or prevents light from being emitted through the bezel 54, reducing glare of the lighting assembly 16.

The bezel 54 defines openings 162 that correspond and align with the optical lenses 28. Accordingly, in the illustrated example, the bezel 54 defines 132 circular openings 162 arranged in four groupings 164, with each grouping 164*a*-164*d* having six rows 166*a*-166*f* (collectively referred to as rows 166) of openings 162 in an alternating pattern between six openings 162 and five openings 162 from top to bottom. This is the same pattern as the optical lenses 28 and the LEDs 20.

For the second through sixth rows 166*b*-166*f* of openings 162, the bezel 54 define rims 168 extending along a perimeter of the corresponding openings 162. These rims 168 protrude relative to the surrounding surface of the bezel 54 to form elevated rims 168 that extend about the perimeter or circumference of the optical faces 94. The rims 168 minimize or prevent light from being emitted through the outer side surfaces of the optical lens 28. For example, where the optical lenses 28 protrude relative to the base surface 96, light emitted from side surfaces between the base surface 96 and the optical face 94 may cause glare or light scatter. The rim 168 assists in blocking this side-emitting light, contributing to the movable narrow "spotlights."

Additionally, for the first row 166*a* of openings 162, a portion of a rim 168 extends along a lower portion of each opening 162 and a visor 170 extends along an upper portion of each opening 162. The visors 170 are integrated with the bezel 54 and extend a greater distance from the optical arrays 26 compared to the rims 168. For example, the rims 168 may extend between about 0.5 mm and about 2 mm from a surface of the bezel 54 that extends over the base surface 96, and the visors 170 extend about 9 mm to about 20 mm from the surface of the bezel 54. The visors 170 form an arced shape that follow the respective opening 162 and are configured to block light beyond a predefined angle relative to the aiming axis 120. In various aspects, the visors 170 block light from the first row 74*a* of LEDs 20 beyond 12° relative to the aiming axis 120. Moreover, the visors 170 may also block light from any of the LEDs 20 in other rows 74 beyond 12° relative to the aiming axis 120 of the first row 74*a* of LEDs 20.

In at least three of the optical arrays 26 illustrated in FIG. 27, the first or top row 90*a* of optical lenses 28 includes the Fresnel style lenses 132, which directs or bends the light at an increased angle relative to other configurations of the optical lens 28. The light beams are directed downwards to spread and increase the size of the beam pattern 32 for the corresponding optical arrays 26 but do have a "spray" that occurs in transition areas of the face 94. The visors 170 reduce or prevent this "spray" upward light relative to the aiming axis 120 of the corresponding LEDs 20. This configuration reduces glare and light scatter generated by the lighting assembly 16.

With the visors 170, the light remains directed at the target area 12 and does not spread beyond the target area 12. In a specific example, the target area 12 is a park or field on a residential street with the park on one side of the street and houses on the opposing side. The light is directed to the park, and the visors 170 prevent light scatter from reaching the houses on the opposing side of the street from the park behind the lighting assembly 16. The visors 170 block light scatter and do not substantially impede the light direction for the remaining beam patterns 32. The addition of extended material on the bezel 54 around each optic 28 and individual visor 170 for each LED 20 reduces glare without the use of a visor over the entire fixture 16. The bezel 54 includes the elevated rims 168 and the visors 170 about the optics 28, respectively, as well as material covering the optical arrays 28 around the optics 28 and along the outer rim 106 of the optical arrays 26 to the heatsink 52. The additional material added to the face of the bezel 54 and the top row visors 170 around corresponding LEDs 20 (instead of the whole fixture 16) reduces glare. The use of the narrow 11-degree base beam results in an optical system 24 that does not generate wide beams from optics 28 that create optic glare that the bezel 54 cannot overcome. The lighting assemblies 16 generate the narrow light beams (without hot spots at the center) and with the bezel 54 this results in more light on the field or target area 12, while reducing glare (without the use of a full fixture visor).

While the lighting assemblies 16 and the overall luminaire 10 can be used without a full fixture visor, it is within the scope of the disclosure to include the full fixture visor with the light assemblies 16. In such examples, a sharp cutoff (i.e., full light blackout) at a low vertical angle (e.g., about 12 degrees above the aiming axis 120) can be achieved due to the thin horizontal arrangement of the optics 28. Moreover, due to the thin horizontal arrangement of the optics 28, a shorter full fixture visor can be utilized compared to conventional designs.

Figure 29:
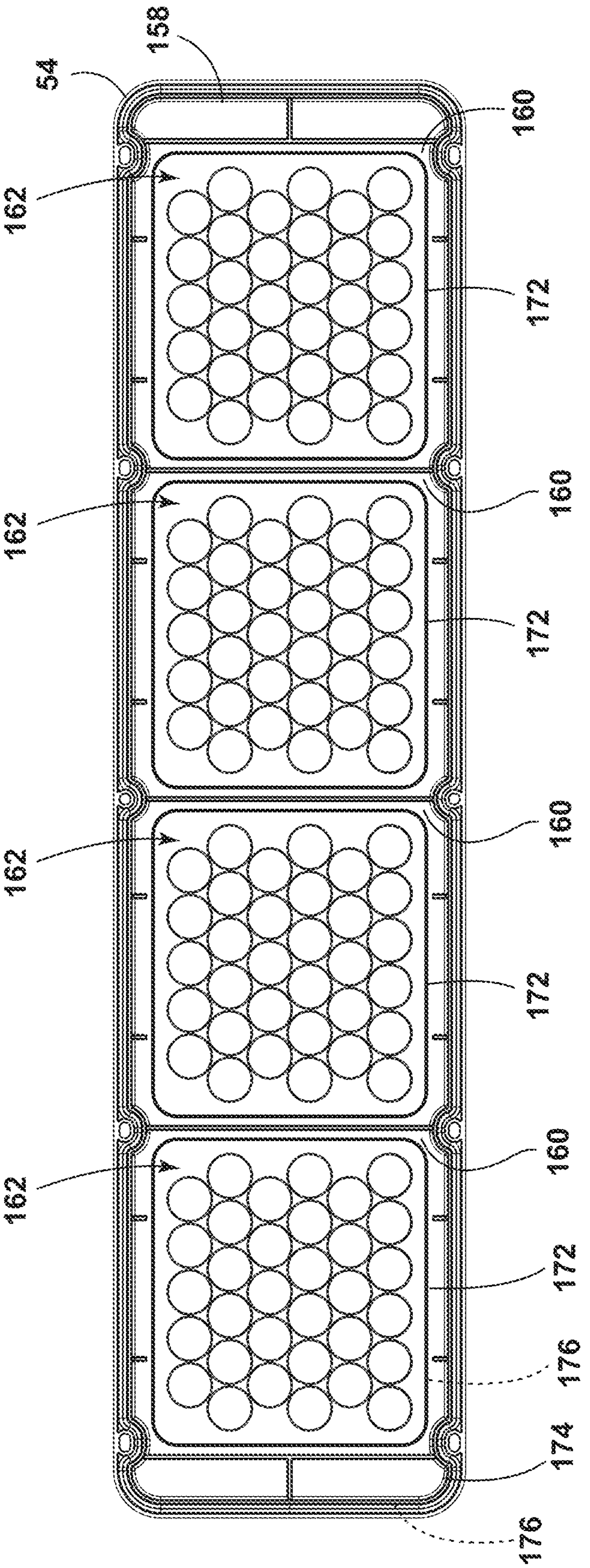
FIG. 29 is a rear elevational view of a bezel for a lighting assembly, according to the present disclosure.

Referring still to FIG. 28, as well as FIG. 29, the bezel 54 is sealed to both the optical arrays 26 and the heatsink 52 (FIG. 1). The sealing engagement between the components assists with maintaining the position of the component relative to one another, as well as for protecting internal components from environmental conditions. Each optical array 26 includes the groove 108 generally defined between the outer rim 106 and the base 104 as described herein. The bezel 54 includes corresponding inner channels 172, which extends about each of the groupings 164 of openings 162. Further, the bezel 54 defines an outer channel 174, which extends generally along the perimeter of the bezel 54.

A sealant 176 is configured to be disposed in the inner channels 172 and the outer channel 174 of the bezel 54. Once the sealant 176 is disposed within the inner and outer channels 172, 174, the bezel 54 is positioned over the optical system 24 and on the heatsink 52. The sealant 176 is generally silicone, which has a sufficient viscosity to maintain its position when dispensed on the bezel 54. The sealant 176 provides a hermetically sealed lighting assembly 16.

Figure 30:
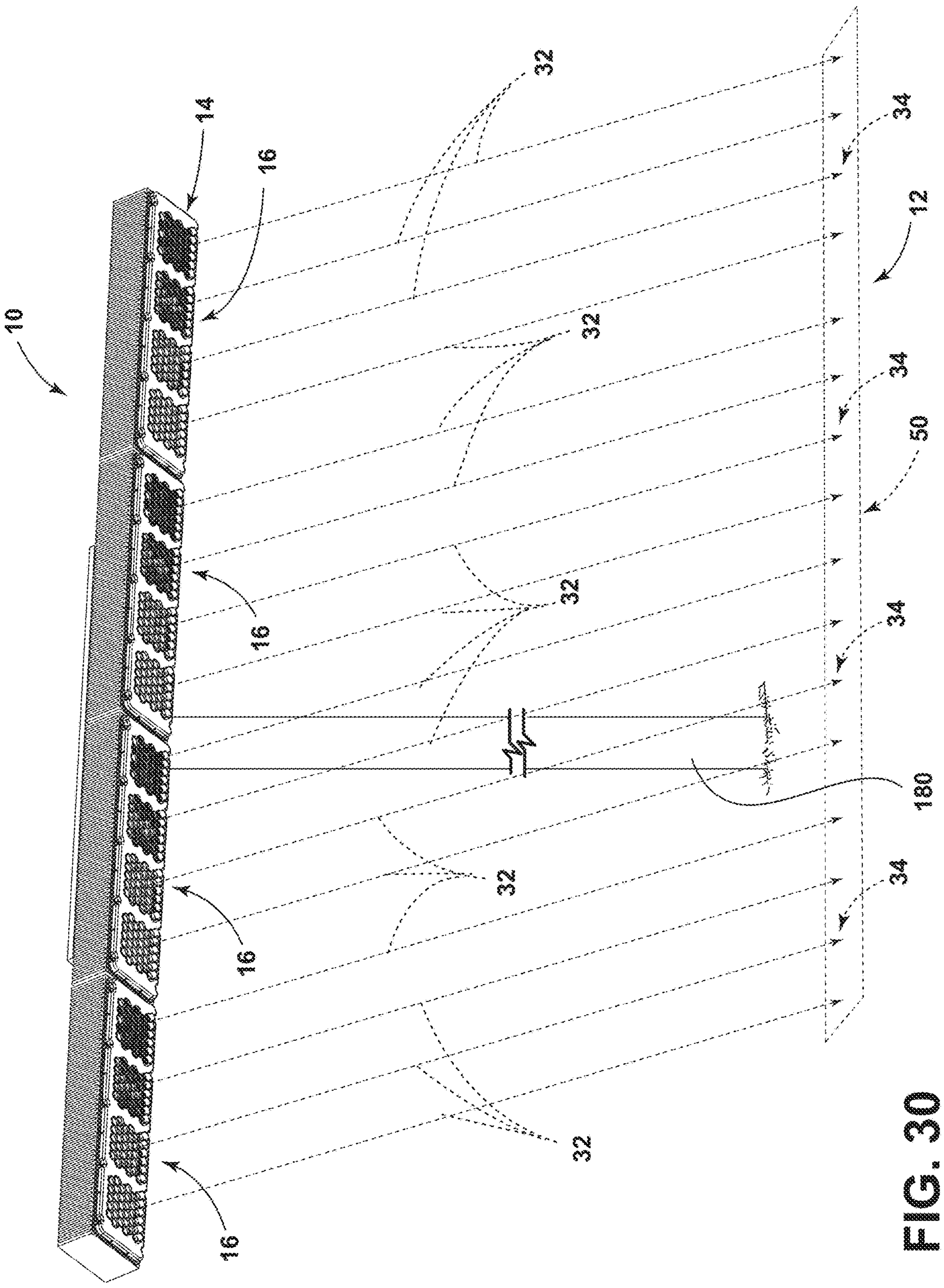
FIG. 30 is a side perspective view of a luminaire including multiple lighting assemblies, where the luminaire produces a light output pattern formed from a combination of composite beams from the lighting assemblies, according to the present disclosure.

Referring to FIG. 30, the luminaire 10 includes multiple lighting assemblies 16 coupled together. The luminaire 10 is coupled with a support post 180, which extends vertically from the ground area 12 to support the lighting assemblies 16. The luminaire 10 is constructed by selecting and arranging the lighting assemblies 16 with the composite beams 34 to form the overall lighting effect 50. The overall lighting effect 50 is formed by the multiple composite beams 34 being combined. The composite beams 34 may be the same if the optical arrays 26 on the lighting assemblies 16 are the same, the composite beams 34 may be different if the optical arrays 26 are different, or combinations thereof based on the optical arrays 26 chosen for each lighting assembly 16.

Figure 31:
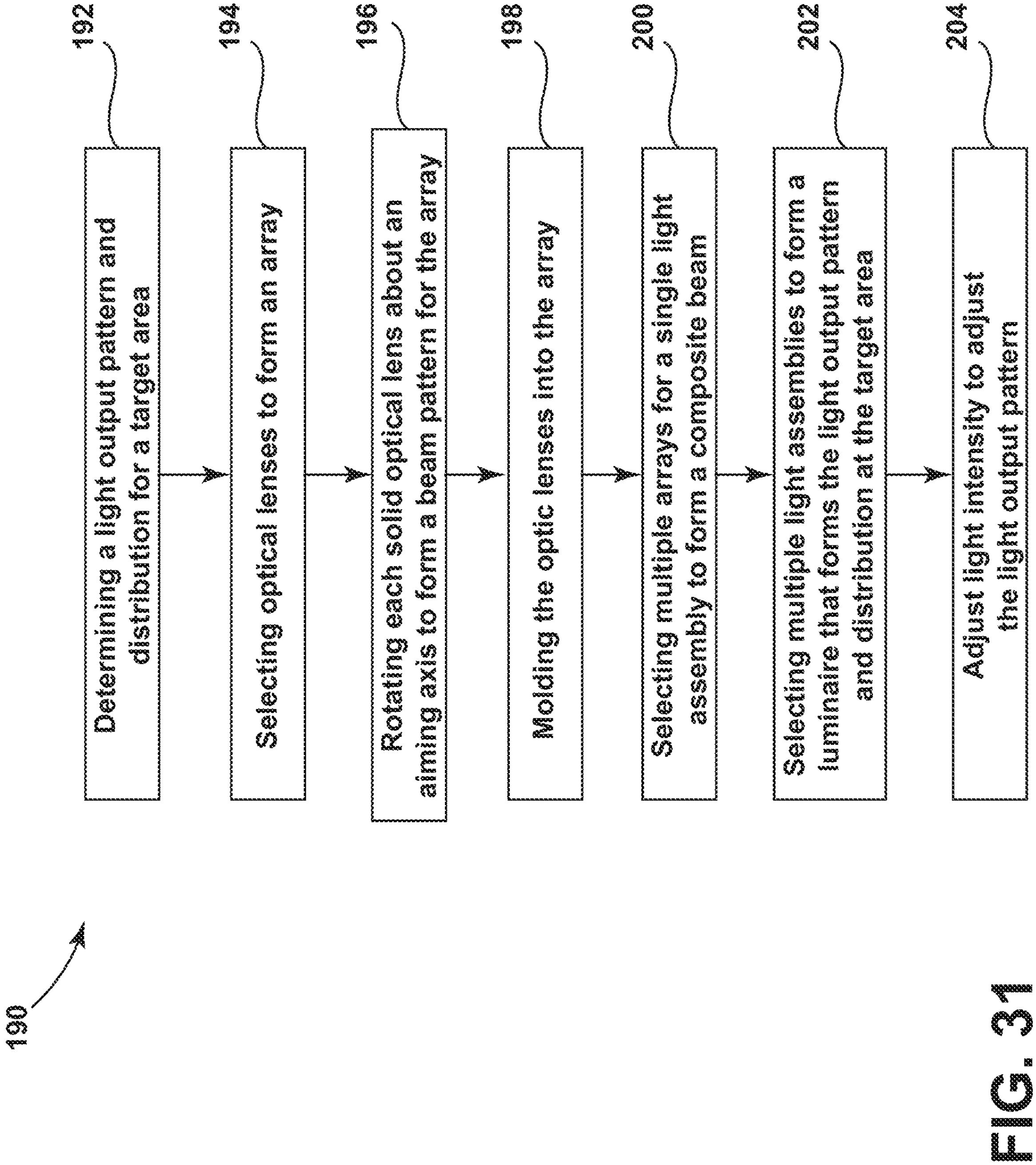
FIG. 31 is a flow chart of a method of designing a luminaire, according to the present disclosure.

Referring to FIG. 31, as well as FIGS. 1-30, a method 190 of designing a luminaire 10 for illuminating the target area 12 includes step 192 of determining the overall lighting effect 50 to be generated by the luminaire 10. The overall lighting effect 50 is the light output pattern 50 and distribution at the target area 12. The light output pattern 50 may be based on the type or location of target area 12, as well as the height of the luminaire 10 from the ground area 12.

For example, multiple luminaires 10 may be utilized to illuminate a sporting field. In general, a similar lighting intensity is desired across the sporting field. This lighting intensity is typically defined within a predefined range to be found in each section of the sporting field when the sporting field is divided into a grid. In such examples, multiple luminaires 10 are typically used in a center of the field. These luminaires 10 may have overlapping light output patterns 50. Accordingly, the light output patterns 50 from the individual luminaires 10 at center field may be larger or more dispersed with the intensity of light being formed by overlapping light output patterns 50, providing a smoother lighting effect. In comparison, fewer luminaires 10 may be positioned toward the end or edge of the sporting field. Fewer luminaires 10 results in less or no overlapping of light output patterns 50. Accordingly, the individual luminaires 10 at the end of the sporting field may provide narrower light output patterns 50, having an increased light intensity. The narrower light output patterns 50 provide more intense lighting with a fewer number of luminaires 10. However, the light intensity is generally within the predefined range at the center of the field and the ends of the field using the different light output patterns 50.

In another example, when the support post 180 is shorter, meaning the luminaire 10 is closer to the ground, the light output pattern 50 may be wider. When the support post 180 is taller, the light output pattern 50 may be narrower.

In step 194, the optical lenses 28 are selected to form the optical array 26. Each solid optical lens 28 is a narrow beam optical lens 28 configured to define the beam size of less than an 11-degree base beam width for the directed light passing therethrough. Each optical lens 28 generates a narrow beam of light that is shaped and directed to a specific spot to work in conjunction with the other optical lenses 28 of the optical array 26 to form a controlled and shaped beam pattern 32. The optics 28 redirect the 11-degree base beam width of light from the corresponding LEDS 20. In this way, the 33 optical lenses 28 for the optical array 26 are selected to form the beam pattern 32. The light output pattern 50 to be generated affects the composite beam 34, the beam patterns 32, and consequently which optical lenses 28 are chosen. For example, wider light output patterns 50 may utilize optical arrays 26 that produce wider composite beams 34.

In step 196, each solid optical lens 28 is rotated about the aiming axis 120 to move the light in the selected direction to form the beam pattern 32. In this way, the optical lenses 28 are rotated between about 0° relative to the aiming axis 120 and up to about +/−90°. Other rotational positions beyond this 180° range are also contemplated without departing from the teachings herein. Moreover, each of the optical face 94 and the light guiding bodies 92 for each optical lens 28 may be rotated independently of one another. The rotational position in combination with the redirection of directed light by the integral or molded TIR lens 122, light guiding body 92, and light directing surface 94 of the optical lens 28 defines the direction or focus of the emitted light.

Once the optical lenses 28 are selected and rotated to positions that form the beam pattern 32, in step 198, the optics 28 are molded to the base surface 96. Once molded, the optical lenses 28 are fixed to the base 104 and are no longer able to be adjusted relative to the base 104. This produces a solid optical array 26 having integrated, solid, fixed optical lenses 28.

In step 200, multiple optical arrays 26 are selected for a single light assembly 16 to form the selected composite beam 34. In this way, one or more of the different types of optical arrays 26 may be positioned on the circuit board 18 in an arrangement that provides the selected composite beam 34 for the lighting assembly 16. This step 200 can include selecting and positioning multiple optical arrays 26 that have one or more configurations of the optical lenses 28, including combinations of symmetrical and non-symmetrical solid optical lenses 28 such as different configurations of the optical face 94 and/or the light guiding body 92. The optical lens 28 as a whole, the optical face 94, and/or the light guiding body 92 may be symmetrical or non-symmetrical relative to at least one plane. The optical arrays 26 are selected based on the beam patterns 32 and arranged along the circuit board 18 in a manner that combined the beam patterns 32 to form the selected composite beam 34.

In step 202, multiple lighting assemblies 16 are selected to form the luminaire 10 that generates the light output pattern 50 and distribution of the target area 12. One or more configurations of lighting assemblies 16 may be combined, resulting in the luminaire 10 having one or more configurations of the optical system 24. The lighting assemblies 16 may be arranged relative to one another for the composite beams 34 to form the overall light output pattern 50.

In step 204, the light output pattern 50 may be further adjusted to adjust the light output pattern 50 and light distribution of the luminaire 10 by adjusting the intensity of each of the circuit boards 18 included in the luminaire 10. For example, where two circuit boards 18 are utilized in the luminaire 10, one of the circuit boards 18 can have a set of optical arrays 26 that create a stronger center beam and narrow focus, while the second circuit board 18 has a different set of optical arrays 26 that focuses light downward or toward the support post 180. Each circuit board 18 is controlled by a different driver or power source. By varying the power to each of the circuit boards 18, the light output pattern 50 results may be changed as the control to the power source by percent output can be adjusted remotely and in real-time. Accordingly, the light output pattern 50 may also be modified after installation, without adjusting the aim of the luminaire 10 or the optical system 24.

The steps 192-204 of the method 190 can be omitted, repeated, and/or performed in any order, simultaneously, or in sequence. For example, once an optical array 26 or lighting assembly 16 is formed and selected, the output can be calculated or tested. If the output is not the selected output beam pattern 32, composite beam 34, or overall pattern 50, the optical array 26 or lighting assembly 16 may be changed until the selected output 50 is achieved.

Each optical lens 28 creates a very narrow beam (normally less than 11 degrees) and is shaped to fill a specific spot or location within the selected or designed beam pattern 32 of each optical array 26. Using the very narrow beam increases the light intensity and efficiency of the lighting assembly 16. Movement and shaping of the light with the optical lenses 28 are accomplished with thinner optical faces 94, to reduce or remove thicker cross-sections that can cause "sink" and distortion. To move the light beam the farthest degree, a thicker section or a Fresnel style lens 132 is used. The Fresnel style lens 132 creates radii in the optical face 94 that can scatter light. To reduce this light scatter, the Fresnel style lens 132 that directs some light upwards is placed more at the top of the optical array 26 in combination with the integrated visors 170 on the bezel 54. To move the light beam a lesser degree, optical lenses 28 with thinner optical faces 94 and/or adjustments to light guiding bodies 92 including the TIR lens 122 (i.e., the symmetrical and non-symmetrical light guiding bodies 92*b*) can be used. The front optics (the front optical face 94) and the back optics (the light guiding bodies 92 with the TIR lens 122) can be rotated, independently and in combination, to achieve the light pattern 50.

Use of the present device and method may provide for a variety of advantages. For example, the luminaire 10 can be designed to achieve a full range of beam patterns 32 by using narrow optics 28. Further, each light beam emitted from the luminaire 10 has a base beam width of less than 11 degrees in size, providing mini "spotlights" to maintain the intensity of the light emitted from each LED 20. Additionally, the overall light pattern output 50 may be customizable through the selection of the optical lenses 28, the position of the optical lenses 28 in the optical array 26, the rotation of the optical lenses 28, the selection of the optical arrays 26, the position of the optical arrays 26 on the circuit board 18, the selection of the lighting assembly 16 with the various configurations of the optical arrays 26, and the arrangement of the lighting assemblies 16 relative to one another. Also, each optical array 26 is formed of narrow beam individual optics 28 to create the composite optical arrays 26. Moreover, the optical system 24 is constructed of silicone to minimize or prevent yellowing and efficiency loss of the emitted light. Additionally, each of the optical arrays 26 may include a combination of one or more types of optical faces 94 as well as a combination of symmetrical and non-symmetrical light guiding bodies 92*b* to create the composite optical arrays 26.

Further, once selected and rotated, the optical lenses 28 are fixed to the optical array 26. Accordingly, after the manufacturing process is complete, the optical lenses 28 are not adjustable relative to the LEDs 20. Moreover, fixing the optical lenses 28 to the optical array 26 maximizes efficiency of the manufacturing process. The luminaire 10 disclosed herein can be mass produced in a cost-effective manner. Accordingly, the luminaire 20 provides a customizable pattern 50 through selection and arrangement of optical lenses 28 and arrays 26 that can be manufactured efficiently. Additional benefits or advantages may be realized and/or achieved.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A luminaire for illuminating a target area, comprising:

an array of lighting assemblies, each lighting assembly including a circuit board, solid-state light sources arranged on a surface of the circuit board, and an optical system, the optical system including:

a first solid integrated optical array associated with a first portion of the solid-state light sources, the first solid integrated optical array including fixed optical lenses each defining a predefined directional focus and a predefined angular light beam for light directed therethrough to form a first beam pattern; and a second solid integrated optical array associated with a second portion of the solid-state light sources, the second solid integrated optical array including fixed optical lenses each defining a predefined directional focus and a predefined angular light beam for light directed therethrough to form a second beam pattern, the second beam pattern being different than and combined with the first beam pattern to form a composite beam for said target area, wherein each optical lens includes a light guiding body and an outer light directing surface, the optical system including a combination of symmetrical and non-symmetrical configurations of the light guiding bodies, and wherein at least one of the non-symmetrical configuration of the light guiding bodies and the light directing surfaces bend the predefined angular light beams relative to aiming axes of the solid-state light sources, respectively, and maintain the predefined angular light beams to form consistent light intensity in the composite beam at said target area.

2. The luminaire of claim 1, wherein the predefined angular light beam of each fixed optical lens of the first solid integrated optical array and the predefined angular light beam of each fixed optical lens of the second solid integrated optical array is a base beam of less than eleven degrees.

3. The luminaire of claim 1, wherein the array of lighting assemblies includes:

a third solid integrated optical array associated with a third portion of the solid-state light sources on the circuit board, the third solid integrated optical array including fixed optical lenses to form a third beam pattern of light directed therethrough; and a fourth solid integrated optical array associated with a fourth portion of the solid-state light sources on the circuit board, the fourth solid integrated optical array including fixed optical lenses to form a fourth beam pattern of light directed therethrough, the third beam pattern and the fourth beam pattern being combined with the first beam pattern and the second beam pattern to form the composite beam, wherein each fixed optical lens of the third and fourth solid integrated optical arrays defines a predefined angular light beam of a base beam of light of less than eleven degrees for light directed therethrough.

4. The luminaire of claim 1, wherein each fixed optical lens of the first and second solid integrated optical arrays includes:

the light guiding body defining a total internal reflection lens; and the outer light directing surface coupled to a respective one of the light guiding bodies, the outer light directing surfaces selected from a group comprising of:

a Fresnel style lens;

a flat lens;

an elevated conical lens;

an optic having a revolved inverted conical face; or rotated configurations thereof, rotation of the fixed optical lenses being relative to the respective aiming axis, the light guiding body and the outer light directing surface configured to maintain the predefined angular light beam of a base beam of less than eleven degrees as light passes therethrough.

5. The luminaire of claim 4, wherein the outer light directing surface of at least a portion of the fixed optical lenses of the first solid integrated optical array are offset relative to a surface of a base of the first solid integrated optical array, the base coupled to each of the fixed optical lenses.

6. The luminaire of claim 1, wherein the first and second solid integrated optical arrays are each constructed of optical silicone.

7. The luminaire of claim 1, further comprising:

a bezel disposed over the first and second solid integrated optical arrays, the bezel defining openings that align with the fixed optical lenses of the first and second solid integrated optical arrays, respectively.

8. The luminaire of claim 7, wherein the bezel includes a visor for each of a set of the openings to reduce light spread beyond a predefined angle relative to an aiming axis of the corresponding fixed optical lenses.

9. The luminaire of claim 1, wherein for at least one optical lens the non-symmetrical configuration of the light guiding body and the light directing surface each move the predefined angular light beam relative to the aiming axis while maintaining the predefined angular light beam at a base beam size of less than eleven degrees.

10. A lighting assembly for a luminaire, comprising:

a circuit board;

light sources arranged on a first surface of the circuit board;

a heat sink coupled to a second surface of the circuit board, the second surface being opposite the first surface;

at least one integrated optical array coupled to the first surface of the circuit board, wherein the at least one integrated optical array includes a base with optical lenses fixed thereto, each optical lens disposed over a corresponding one of the light sources, and wherein each optical lens includes:

a light guiding body defining a total internal reflection lens, wherein the at least one integrated optical array includes at least one symmetrical configuration of the light guiding body and at least one asymmetrical configuration of the light guiding body; and an outer light directing surface, each optical lens adapted to pass a light beam in a predefined direction to form a beam pattern, wherein each optical lens is configured to maintain a base beam size of light passing therethrough, wherein at least one of the asymmetrical configuration of the light guiding body and the outer light directing surface is configured to re-direct the light relative to aiming axes of the light sources while maintaining the base beam size for each optical lens of less than eleven degrees to form a composite beam; and a bezel disposed adjacent to the at least one integrated optical array and sealingly coupled to the heat sink.

11. The lighting assembly of claim 10, wherein at least one of the light guiding bodies is the asymmetrical configuration having a portion with an increased thickness to move the light beam from a center beam intensity.

12. The lighting assembly of claim 10, wherein the at least one integrated optical array includes a first integrated optical array disposed adjacent to a second integrated optical array on the first surface of the circuit board, the optical lenses of the first integrated optical array being different than the optical lenses of the second integrated optical array.

13. The lighting assembly of claim 10, wherein the at least one optical array having the optical lenses is constructed of optical silicone.

14. The lighting assembly of claim 10, wherein the outer light directing surface of each of the optical lenses is selected from a group comprising of:

a Fresnel style lens;

a flat lens;

an elevated conical lens;

an optic having a revolved inverted conical face; or rotated configurations thereof, rotation of the optical lenses being relative to a respective aiming axis.

15. The lighting assembly of claim 10, wherein the outer light directing surface of at least two of the optical lenses are different.

16. The lighting assembly of claim 10, wherein the bezel defines openings aligned with and disposed about the optical lenses, respectively, and wherein the openings are arranged in rows that align with rows of the optical lenses.

17. The lighting assembly of claim 16, wherein the bezel includes an integrated visor adjacent to each of the openings in a first row for limiting light spread, and wherein a combination of the integrated visors with the base beam size being less than eleven degrees is configured to increase light at a target area while reducing glare.

18. The lighting assembly of claim 17, wherein the bezel includes an elevated rim adjacent to each of the openings in a second row, wherein a set of the optical lenses protrude relative to a base surface of the at least one integrated optical array to extend through a corresponding one of the openings in the second row, respectively, and wherein the elevated rims of the bezel extend about a perimeter of the respective one of the set of the optical lenses to reduce light from being directed through side surfaces thereof.

19. The lighting assembly of claim 16, wherein the asymmetrical configuration of the light guiding body is defined when the light guiding body has a thickened portion with an increased thickness relative to a thinner portion forming a remainder of the light guiding body, and wherein the thickened portion has a side surface with a different angle relative to the aiming axis of the respective light source compared to the thinner portion to bend the light.

20. The lighting assembly of claim 16, wherein for at least one optical lens the asymmetrical configuration of the light guiding body and the outer light directing surface each re-direct the light relative to the aiming axis while maintaining the base beam size of less than eleven degrees.

* * * * *